US011864092B2

(12) United States Patent
Yao et al.

(10) Patent No.: US 11,864,092 B2
(45) Date of Patent: Jan. 2, 2024

(54) PERFORMANCE MEASUREMENTS RELATED TO APPLICATION TRIGGERING AND SMS OVER NAS

(71) Applicant: Apple Inc., Cupertino, CA (US)

(72) Inventors: Yizhi Yao, Cupertino, CA (US); Joey Chou, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 17/440,111

(22) PCT Filed: Jun. 12, 2020

(86) PCT No.: PCT/US2020/037528
§ 371 (c)(1),
(2) Date: Sep. 16, 2021

(87) PCT Pub. No.: WO2020/252337
PCT Pub. Date: Dec. 17, 2020

(65) Prior Publication Data
US 2022/0182923 A1 Jun. 9, 2022

Related U.S. Application Data

(60) Provisional application No. 62/860,647, filed on Jun. 12, 2019.

(51) Int. Cl.
*H04W 48/16* (2009.01)
*H04W 4/14* (2009.01)
(Continued)

(52) U.S. Cl.
CPC .............. *H04W 48/16* (2013.01); *H04W 4/14* (2013.01); *H04W 24/10* (2013.01); *H04W 60/04* (2013.01)

(58) Field of Classification Search
CPC . H04W 36/0085; H04W 36/14; H04W 40/36; H04W 24/08; H04W 36/32
(Continued)

(56) References Cited

U.S. PATENT DOCUMENTS

2014/0016614 A1* 1/2014 Velev .................... H04W 36/14
370/331
2021/0022024 A1* 1/2021 Yao .................... H04W 36/0085
(Continued)

FOREIGN PATENT DOCUMENTS

| CN | 110062407 A * | 7/2019 | ......... H04L 41/0893 |
| WO | WO-2019133048 A1 * | 7/2019 | ........... H04B 17/318 |
| WO | WO-2020252337 A1 * | 12/2020 | ......... H04L 41/5009 |

OTHER PUBLICATIONS

English translation of CN-110062407-A Printed Apr. 2023 (Year: 2023).*
(Continued)

*Primary Examiner* — William D Cumming
(74) *Attorney, Agent, or Firm* — Fish & Richardson P.C.

(57) ABSTRACT

Techniques for performance measurements related to application triggering and short message service (SMS) over non-access stratum (NAS) including obtaining raw performance measurements from one or more network functions in a wireless communication network, the one or more network functions including at least one of a network exposure function (NEF) or an access and mobility management function (AMF), and generating performance measurements for the one or more network functions based on the raw performance measurements.

20 Claims, 15 Drawing Sheets

(51) Int. Cl.
*H04W 24/10* (2009.01)
*H04W 60/04* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 2021/0168643 | A1* | 6/2021 | Yao | ....................... H04M 15/00 |
| 2022/0086698 | A1* | 3/2022 | Yao | ........................ H04L 43/20 |
| 2022/0141751 | A1* | 5/2022 | Yao | ....................... H04W 36/32 |
| | | | | 370/331 |
| 2022/0182923 | A1* | 6/2022 | Yao | ....................... H04W 24/08 |
| 2022/0264307 | A1* | 8/2022 | Sasi | .................... H04L 63/1466 |

OTHER PUBLICATIONS

Engrlish translation for CN110062407 Jul. 2023 (Year: 2023).*
[No Author Listed], "3rd Generation Partnership Project; Technical Specification Group Core Network and Terminals; 5G System; Access and Mobility Management Services; Stage 3 (Release 15)," 3GPP TS 29.518 V15.3.0, Mar. 2019, 194 pages.
[No Author Listed], "3rd Generation Partnership Project; Technical Specification Group Core Network and Terminals; 5G System; Session Management Services; Stage 3 (Release 15)," 3GPP TS 29.502 V15.3.0, Mar. 2019, 147 pages.
[No Author Listed], "3rd Generation Partnership Project; Technical Specification Group Core Network and Terminals; 5G System; Technical Realization of Service Based Architecture; Stage 3 (Release 15)," 3GPP TS 29.500 V15.3.0, Mar. 2019, 33 pages.
[No Author Listed], "3rd Generation Partnership Project; Technical Specification Group Core Network and Terminals; Interface between the Control Plane and the User Plane Nodes; Stage 3 (Release 15)," 3GPP TS 29.244 V15.5.0, Mar. 2019, 198 pages.
[No Author Listed], "3rd Generation Partnership Project; Technical Specification Group Core Network and Terminals; T8 reference point for Northbound APIs; (Release 16)," 3GPP TS 29.122 V16.1.0, Mar. 2019, 288 pages.
[No Author Listed], "3rd Generation Partnership Project; Technical Specification Group Radio Access Network; NG-RAN; F1 application protocol (F1AP) (Release 15)," 3GPP TS 38.473 V15.5.0, Mar. 2019, 198 pages.
[No Author Listed], "3rd Generation Partnership Project; Technical Specification Group Radio Access Network; NG-RAN; NG Application Protocol (NGAP) (Release 15)," 3GPP TS 38.413 V15.3.0, Mar. 2019, 319 pages.
[No Author Listed], "3rd Generation Partnership Project; Technical Specification Group Radio Access Network; NG-RAN; Xn application protocol (XnAP) (Release 15)," 3GPP TS 38.423 V15.3.0, Mar. 2019, 294 pages.
[No Author Listed], "3rd Generation Partnership Project; Technical Specification Group Radio Access Network; NR; Physical layer procedures for data (Release 15)," 3GPP TS 38.214, V 15.5.0, Mar. 2019, 103 pages.
[No Author Listed], "3rd Generation Partnership Project; Technical Specification Group Radio Access Network; NR; Radio Resource Control (RRC) protocol specification (Release 15)," 3GPP TS 38.331 V15.5.0, Mar. 2019, 491 pages.
[No Author Listed], "3rd Generation Partnership Project; Technical Specification Group Services and System Aspects; Management and orchestration; 5G end to end Key Performance Indicators (KPI) (Release 15)," 3GPP TS 28.554 V15.2.0, Mar. 2019, 15 pages.
[No Author Listed], "3rd Generation Partnership Project; Technical Specification Group Services and System Aspects; Management and orchestration; 5G performance measurements (Release 16)," 3GPP TS 28.552 V16.1.0, Mar. 2019, 87 pages.
[No Author Listed], "3rd Generation Partnership Project; Technical Specification Group Services and System Aspects; Policy and charging control architecture (Release 16)," 3GPP TS 23.203 V16.0.0, Mar. 2019, 263 pages.
[No Author Listed], "3rd Generation Partnership Project; Technical Specification Group Services and System Aspects; Policy and Charging Control Framework for the 5G System; Stage 2 (Release 16)," 3GPP TS 23.503 V16.0.0, Mar. 2019, 84 pages.
[No Author Listed], "3rd Generation Partnership Project; Technical Specification Group Services and System Aspects; Procedures for the 5G System; Stage 2 (Release 15)," 3GPP TS 23.502, V 15.3.0, Sep. 2019, 329 pages.
[No Author Listed], "3rd Generation Partnership Project; Technical Specification Group Services and System Aspects; Security architecture and procedures for 5G system (Release 15)," 3GPP TS 33.501 V15.4.0, Mar. 2019, 187 pages.
[No Author Listed], "3rd Generation Partnership Project; Technical Specification Group Services and System Aspects; System Architecture for the 5G System; Stage 2 (Release 16)," 3GPP TS 23.501 V16.0.2, Apr. 2019, 317 pages.
[No Author Listed], "3rd Generation Partnership Project; Technical Specification Group Services and System Aspects; Telecommunication management; Key Performance Indicators (KPI) for Evolved Universal Terrestrial Radio Access Network (E-UTRAN); Requirements (Release 15)," 3GPP TS 32.451 V15.1.0 , Dec. 2018, 13 pages.
[No Author Listed], "3rd Generation Partnership Project; Technical Specification Group Services and System Aspects; Telecommunication management; Performance Management (PM); Concept and requirements (Release 15)," 3GPP TS 32.401 V15.0.0, Jun. 2018, 29 pages.
[No Author Listed], "3rd Generation Partnership Project; Technical Specification Group Services and System Aspects; Telecommunication management; Performance Management (PM); Performance measurements Evolved Universal Terrestrial Radio Access Network (E-UTRAN) (Release 16)," 3GPP TS 32.425 V16.2.0, Mar. 2019, 101 pages.
[No Author Listed], "3rd Generation Partnership Project; Technical Specification Group Services and Systems Aspects; Management and orchestration of 5G networks; Performance measurements and assurance data (Release 15)," 3GPP TS 28.552 V0.5.2, Aug. 2018, 31 pages.
[No Author Listed], "Network Functions Virtualization (NFV) Release 2; Management and Orchestration; Performance Measurements Specification," ETSI GS NFV-IFA 027 V2.4.1, May 2018, 39 pages.
3GPP TR 21.905: "Vocabulary for 3GPP Specifications". [No Author Listed], "3rd Generation Partnership Project; Technical Specification Group Services and System Aspects; Vocabulary for 3GPP Specifications (Release 15)," 3GPP TR 21.905 V15.1.0, Dec. 2018, 65 pages.
Chimento et al., "Defining Network Capacity," Network Working Group, RFC 5136, Feb. 2008, 14 pages.
Intel, "pCR 28.552 Add event exposure related measurements for NEF," 3GPP TSG SA WG5 (Telecom Management) Meeting #120, S5-185516, Aug. 20-24, 2018, Belgrade, Serbia, 4 pages.
International Preliminary Report on Patentability in International Appln. No. PCT/US2020/037528, dated Dec. 23, 2021, 13 pages.
International Search Report and Written Opinion in International Appln. No. PCT/US2020/037528, dated Oct. 19, 2020, 20 pages.
Invitation to Pay Additional Fess in International Appln. No. PCT/US2020/037528, dated Aug. 28, 2020, 15 pages.

* cited by examiner

PERFORMANCE MEASUREMENTS RELATED TO APPLICATION TRIGGERING AND SMS OVER NAS

CROSS-REFERENCE TO RELATED APPLICATION

The present application is a U.S. National Phase application under 35 U.S.C. § 371 of International Patent Application No. PCT/US2020/037528, filed on Jun. 12, 2020, which claims priority to U.S. Provisional Patent Application No. 62/860,647, filed Jun. 12, 2019, the disclosures of each of which are incorporated herein by reference in their entirety.

TECHNICAL FIELD

This disclosure relates generally to performance measurements in wireless communications.

BACKGROUND

Wireless communications have evolved significantly from early voice systems to today's highly sophisticated integrated communication platform. The next generation wireless communication system, fifth generation new radio (5G NR), will expand wireless communications to users operating vastly different and sometimes conflicting services and applications. In general, 5G NR will evolve based on the third generation partnership project (3GPP) long term evolution advance (LTE-Advanced) standard with additional potential new radio access technologies (RATs) to improve wireless connectivity solutions.

SUMMARY

In general, in an aspect, a method includes obtaining raw performance measurements from one or more network functions in a wireless communication network, the one or more network functions including at least one of a network exposure function (NEF) or an access and mobility management function (AMF), and generating performance measurements for the one or more network functions based on the raw performance measurements.

In general, in an aspect, a processor for a telecommunications device includes circuitry to execute one or more instructions that, when executed, cause the processor to perform operations including: obtaining raw performance measurements from one or more network functions in a wireless communication network, the one or more network functions including at least one of a NEF or an AMF, and generating performance measurements for the one or more network functions based on the raw performance measurements.

In general, in an aspect, a non-transitory computer readable storage medium storing instructions which, when executed by one or more processors, cause the one or more processors to perform operations including: obtaining raw performance measurements from one or more network functions in a wireless communication network, the one or more network functions including at least one of a NEF or an AMF, and generating performance measurements for the one or more network functions based on the raw performance measurements.

Implementations of any of the aspects can include one or a combination of two or more of the following features.

In some examples, the one or more network functions are NEFs, and the performance measurements are related to application triggering requested by an application function. The performance measurements can include one or more of a number of application trigger requests, a number of application trigger requests accepted for delivery, a number of application trigger requests rejected for delivery, a number of protocol data unit (PDU) sessions requested to modify, or a number of application trigger delivery reports. The number of application trigger requests can be based on a cumulative counter that is triggered on receipt of a delivery request (e.g., a Nnef_Trigger_Delivery request) by a NEF from the application function. The number application trigger requests accepted for delivery can be based on a cumulative counter that is triggered on transmission of a delivery response (e.g., a Nnef_trigger_Delivery response) by a NEF to the application function, with the delivery response including an indication that an application trigger request has been accepted for delivery to a user equipment (UE). The number of application trigger requests rejected for delivery can be based on a cumulative counter that is triggered on transmission of a delivery response (e.g., a Nnef_Trigger_Delivery response) by a NEF to the application function, with the delivery response including an indication that an application trigger request has been rejected for delivery to a UE. In some examples, the number of application trigger requests rejected for delivery is incremented per error code (e.g., per response code, as specified in the 3GPP technical specifications). The number of application trigger delivery reports can be based on a cumulative counter that is triggered on transmission of a delivery message (e.g., a Nnef_Trigger_Delivery Notify message) by a NEF to the application function, with the delivery message including an indication of a delivery result of an application trigger. In some examples, the number of application trigger delivery reports is incremented per delivery result (e.g., success, failure, or another result specified in the 3GPP technical specifications).

In some examples, the one or more network functions are AMFs, and the performance measurements are related to short message service (SMS) over non-access stratum (NAS). The performance measurements include one or more of a number of registration requests for SMS over NAS, a number of successful registrations allowed for SMS over NAS, a number of attempted mobile originated (MO) SMS messages over NAS, a number of MO SMS messages successfully transported over NAS, a number of attempted mobile terminated (MT) SMS messages over NAS, or a number of MT SMS messages successfully transported over NAS.

The number of registration requests for SMS over NAS can be based on a cumulative counter that is triggered on receipt of a registration request message by an AMF from a UE, the registration request message including an indication that the UE supports SMS delivery over NAS. The number of successful registrations allowed for SMS over NAS can be based on a cumulative counter that is triggered on transmission of a registration accept message by an AMF to a UE, the registration accept message including an indication that the SMS is allowed.

The number of attempted MO SMS messages over NAS can be based on a cumulative counter that is triggered on receipt of a NAS message by an AMF from a UE, the NAS message including an indication of SMS transportation. The number of MO SMS messages successfully transported over NAS can be based on a cumulative counter that is triggered on transmission of a NAS message by an AMF to a UE, the NAS message including an indication that the MO SMS message has been successfully delivered.

The number of attempted MT SMS messages over NAS can be based on a cumulative counter that is triggered on transmission of a NAS message by an AMF to a UE, the NAS message including an indication of SMS transportation. The number of MT SMS messages successfully transported over NAS can be based on a cumulative counter that is triggered on receipt of a NAS message by an AMF from a UE, the NAS message including an indication that the MT SMS message has been successfully delivered.

In some examples, the performance measurements is separated by access type (e.g., 3GPP access and non-3GPP access). In other examples, the performance measurements are made without regard to the access type. The raw performance measurements can be obtained, and the performance measurements can be generated, by a service producer that is located, for example, in one of the one or more NEFs, AMFs, or another management function. The generated performance measurements can be stored, transmitted, displayed, or otherwise provided to end users (e.g., service consumers) in any suitable form.

The details of one or more implementations are set forth in the accompanying drawings and the description below. The techniques described here may be implemented by one or more wireless communication systems, components of a wireless communication system (e.g., a user equipment, a base station), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

The present disclosure provides techniques for generating performance measurements in wireless communication networks, such as 5G NR networks. In particular, the techniques described here provide for measuring the performance of application triggering by network exposure functions (NEFs) and short message service (SMS) over non-access stratum (NAS) by access and mobility management functions (AMFs). In doing so, the performance of application triggering and SMS over NAS can be monitored to identify potential problems in the network or network interface, and performance indicators can be provided to end users.

Figure 1:
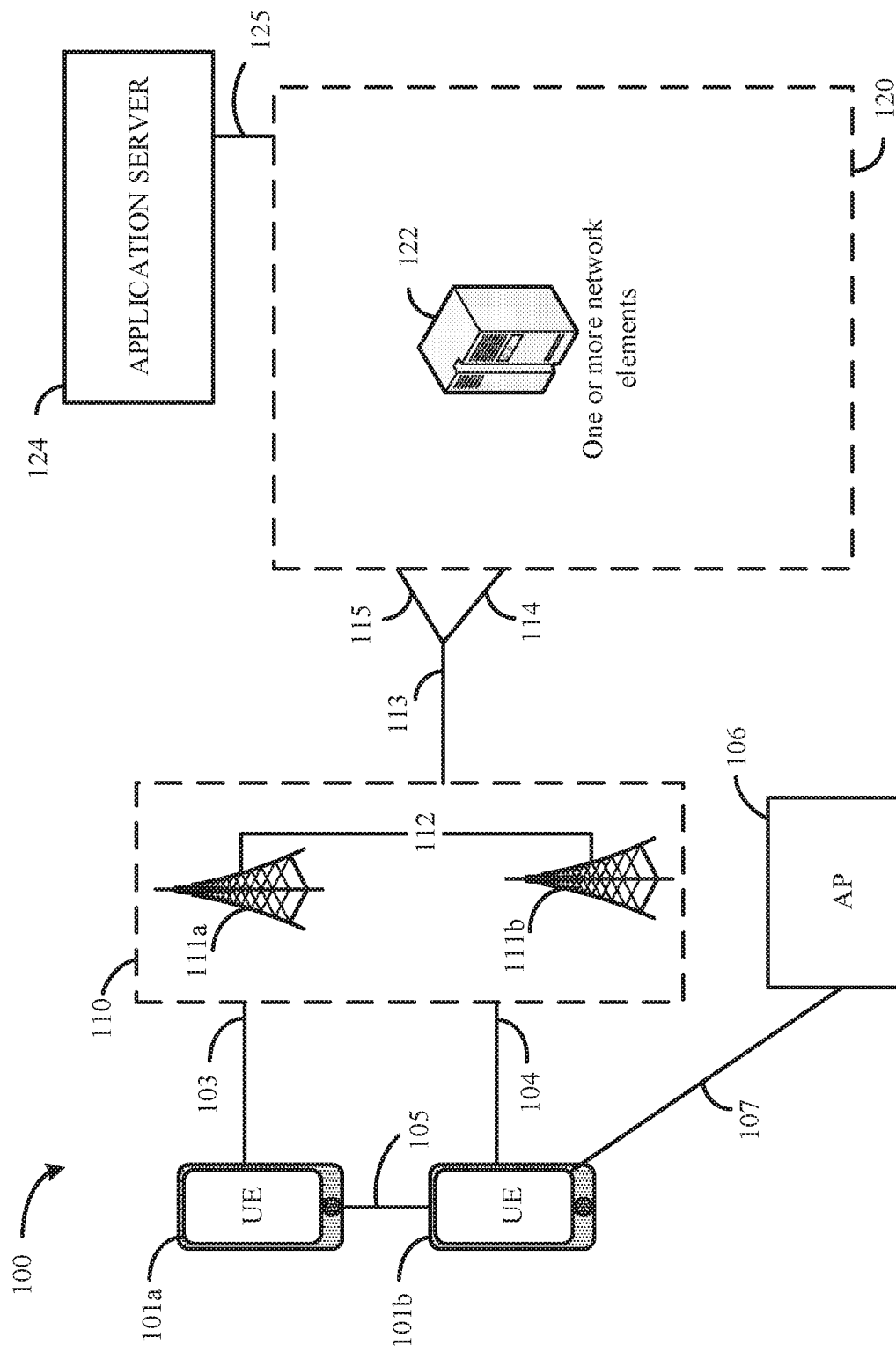
FIGS. 1-3 illustrate example wireless communication systems.

FIG. 1 illustrates an example wireless communication system 100. For purposes of convenience and without limitation, the example system 100 is described in the context of the LTE and 5G NR communication standards as defined by the 3GPP technical specifications. However, the technology described herein may be implemented in other communication systems using other communication standards, such as other 3GPP standards or IEEE 802.16 protocols (e.g., WMAN or WiMAX), among others.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UNITS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using license assisted access (LAA), enhanced-LAA (eLAA), or further enhanced-LAA (feLAA) mechanisms. In these implementations, the UEs 101 and the RAN nodes 111 may perform one or more known medium-sensing operations or carrier-sensing operations, or both, to determine whether one or more channels in the unlicensed spectrum are unavailable or otherwise occupied prior to transmitting in the unlicensed spectrum. The medium/carrier sensing operations may be performed according to a listen-before-talk (LBT) protocol. LBT is a mechanism in which equipment (for example, UEs 101, RAN nodes 111) senses a medium (for example, a channel or carrier frequency) and transmits when the medium is sensed to be idle (or when a specific channel in the medium is sensed to be unoccupied). The medium sensing operation may include clear channel assessment (CCA), which uses energy detection to determine the presence or absence of other signals on a channel in order to determine if a channel is occupied or clear. This LBT mechanism allows cellular/LAA networks to coexist with incumbent systems in the unlicensed spectrum and with other LAA networks. Energy detection may include sensing RF energy across an intended transmission band for a period of time and comparing the sensed RF energy to a predefined or configured threshold.

The incumbent systems in the 5 GHz band can be WLANs based on IEEE 802.11 technologies. WLAN employs a contention-based channel access mechanism (e.g., CSMA with collision avoidance (CSMA/CA)). In some examples, when a WLAN node (e.g., a mobile station (MS), such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value as the transmission succeeds. In some examples, the LBT mechanism designed for LAA is similar to the CSMA/CA of WLAN. In some examples, the LBT procedure for DL or UL transmission bursts, including PDSCH or PUSCH transmissions, respectively, may have an LAA contention window that is variable in length between X and Y extended CAA (ECCA) slots, where X and Y are minimum and maximum values for the CWSs for LAA. In one example, the minimum CWS for an LAA transmission may be 9 microseconds (μs); however, the size of the CWS and a maximum channel occupancy time (for example, a transmission burst) may be based on governmental regulatory requirements.

In some examples, the LAA mechanisms are built on carrier aggregation technologies of LTE-Advanced systems. In CA, each aggregated carrier is referred to as a component carrier. In some examples, a component carrier may have a bandwidth of 1.4, 3, 5, 10, 15 or 20 MHz, and a maximum of five component carriers can be aggregated to provide a maximum aggregated bandwidth is 100 MHz. In frequency division duplex (FDD) systems, the number of aggregated carriers can be different for DL and UL. For example, the number of UL component carriers can be equal to or lower than the number of DL component carriers. In some cases, individual component carriers can have a different bandwidth than other component carriers. In time division duplex (TDD) systems, the number of component carriers as well as the bandwidths of each component carrier is usually the same for DL and UL.

Carrier aggregation can also include individual serving cells to provide individual component carriers. The coverage of the serving cells may differ, for example, because component carriers on different frequency bands may experience different path loss. A primary service cell (PCell) may provide a primary component carrier for both UL and DL, and may handle RRC and non-access stratum (NAS) related activities. The other serving cells are referred to as secondary component carriers (SCells), and each SCell may provide an individual secondary component carrier for both UL and DL. The secondary component carriers may be added and removed as required, while changing the primary component carrier may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It may also inform the UEs 101 about the transport format, resource allocation, and hybrid automatic repeat request (HARQ) information related to the uplink shared channel. Downlink scheduling (e.g., assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some examples, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. In LTE, there can be four or more different PDCCH formats defined with different numbers of CCEs (e.g., aggregation level, L=1, 2, 4, or 8).

Some implementations may use concepts for resource allocation for control channel information that are an extension of the above-described concepts. For example, some implementations may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs in some examples.

Figure 2:
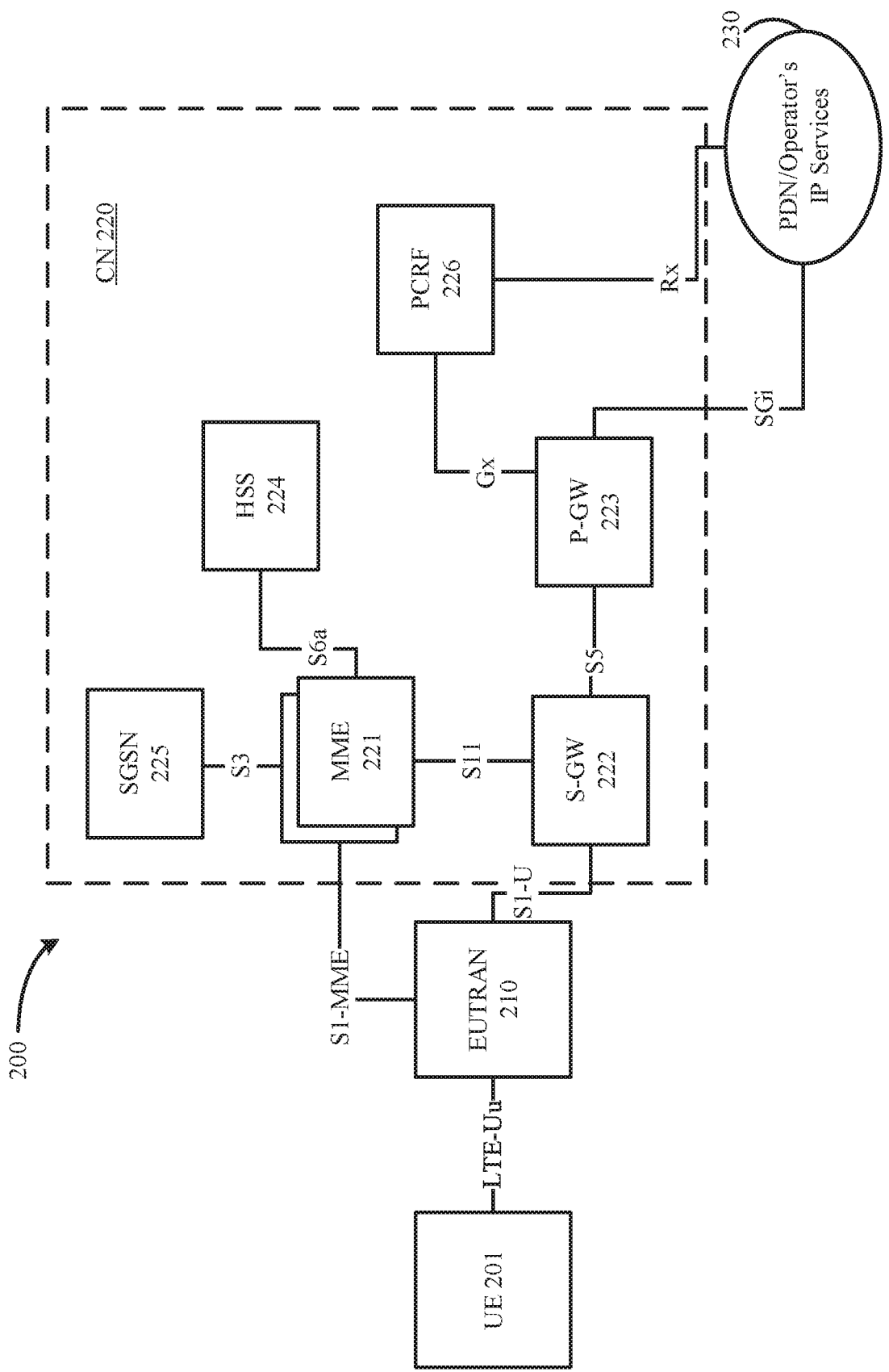

The RAN nodes 111 are configured to communicate with one another using an interface 112. In examples, such as where the system 100 is an LTE system (e.g., when the core network 120 is an evolved packet core (EPC) network as shown in FIG. 2), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some examples, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

Figure 3:
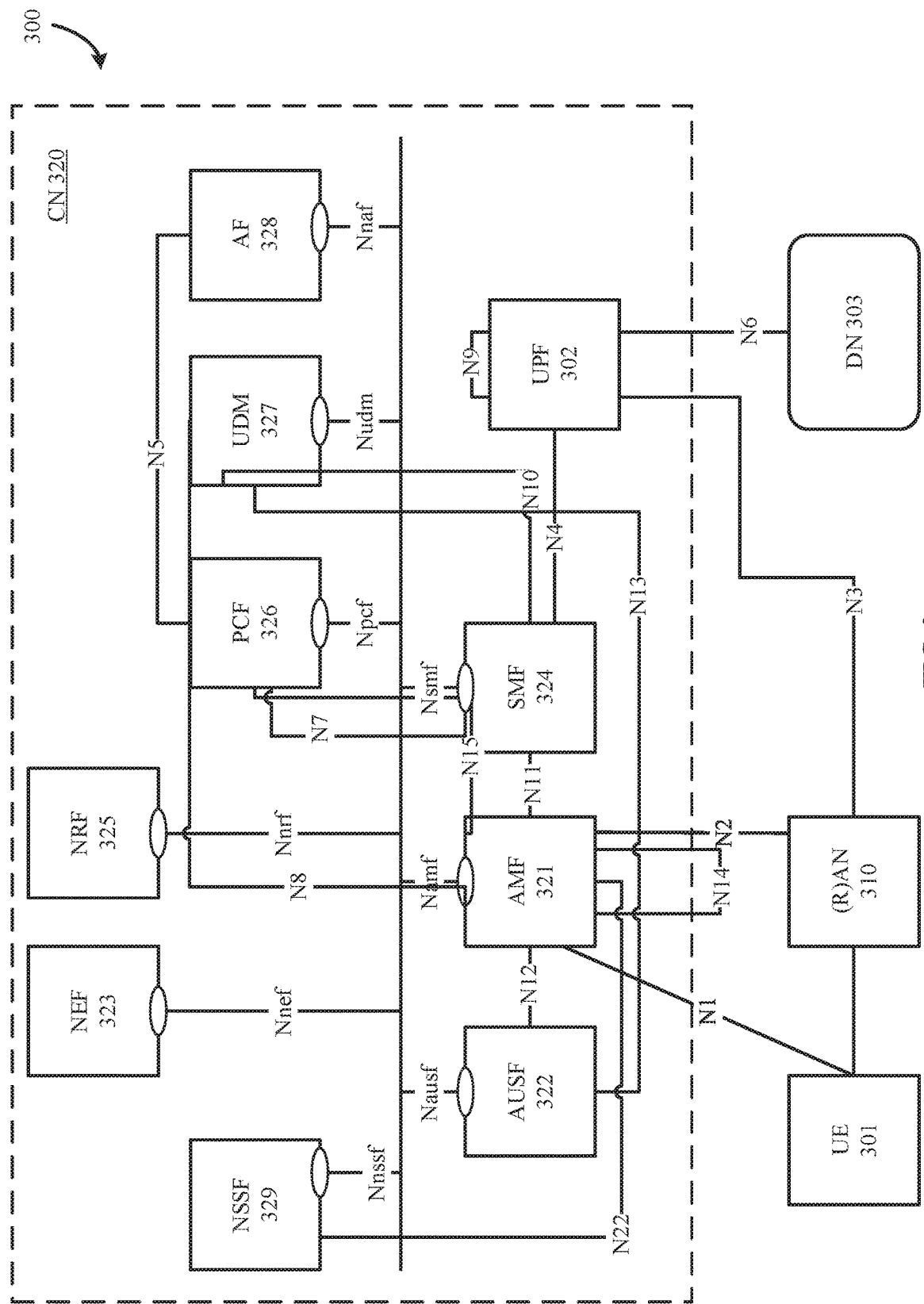

In some examples, such as where the system 100 is a 5G NR system (e.g., when the core network 120 is a 5G core network as shown in FIG. 3), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some examples, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some examples, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both.

Generally, an application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120.

In some examples, the CN 120 may be a 5G core network (referred to as "5GC 120"), and the RAN 110 may be connected with the CN 120 using a next generation interface 113. In some examples, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs). Examples where the CN 120 is a 5GC 120 are discussed in more detail with regard to FIG. 3.

In some examples, the CN 120 may be an EPC (referred to as "EPC 120" or the like), and the RAN 110 may be connected with the CN 120 using an S1 interface 113. In some examples, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

FIG. 2 illustrates an example architecture of a system 200 including a CN 220. In this example, the system 200 may implement the LTE standard such that the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a PDN gateway (P-GW) 223, a high-speed packet access (HSS) function 224, and a serving GPRS support node (SGSN) 225.

The MMEs 221 may be similar in function to the control plane of legacy SGSN, and may implement mobility management (MM) functions to keep track of the current location of a UE 201. The MMEs 221 may perform various mobility management procedures to manage mobility aspects in access such as gateway selection and tracking area list management. Mobility management (also referred to as "EPS MM" or "EMM" in E-UTRAN systems) may refer to all applicable procedures, methods, data storage, and other aspects that are used to maintain knowledge about a present location of the UE 201, provide user identity confidentiality, or perform other like services to users/subscribers, or combinations of them, among others. Each UE 201 and the MME 221 may include an EMM sublayer, and an mobility management context may be established in the UE 201 and the MME 221 when an attach procedure is successfully completed. The mobility management context may be a data structure or database object that stores mobility management-related information of the UE 201. The MMEs 221 may be coupled with the HSS 224 using a S6a reference point, coupled with the SGSN 225 using a S3 reference point, and coupled with the S-GW 222 using a S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network, among other functions. The S3 reference point between the MMEs 221 and the SGSN 225 may enable user and bearer information exchange for inter-3GPP access network mobility in idle or active states, or both.

The HSS 224 may include a database for network users, including subscription-related information to support the network entities' handling of communication sessions. The EPC 220 may include one or more HSSs 224 depending on the number of mobile subscribers, on the capacity of the equipment, on the organization of the network, or combinations of them, among other features. For example, the HSS 224 can provide support for routing, roaming, authentication, authorization, naming/addressing resolution, location dependencies, among others. A S6a reference point between the HSS 224 and the MMEs 221 may enable transfer of subscription and authentication data for authenticating or authorizing user access to the EPC 220 between HSS 224 and the MMEs 221.

The S-GW 222 may terminate the S1 interface 113 ("S1-U" in FIG. 2) toward the RAN 210, and may route data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 using a S5 reference point.

The P-GW 223 may terminate a SGi interface toward a PDN 230. The P-GW 223 may route data packets between the EPC 220 and external networks such as a network including the application server 130 (sometimes referred to as an "AF") using an IP interface 125 (see, e.g., FIG. 1). In some examples, the P-GW 223 may be communicatively coupled to an application server (e.g., the application server 130 of FIG. 1 or PDN 230 in FIG. 2) using an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a policy control and charging rules function (PCRF) 226 using a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 using the P-GW 223. The application server 230 may signal the PCRF 226 to indicate a new service flow and select the appropriate quality of service (QoS) and charging parameters. The PCRF 226 may provision this rule into a PCEF (not shown) with the appropriate traffic flow template (TFT) and QoS class identifier (QCI), which commences the QoS and charging as specified by the application server 230. The Gx reference point between the PCRF 226 and the P-GW 223 may allow for the transfer of QoS policy and charging rules from the PCRF 226 to PCEF in the P-GW 223. A Rx reference point may reside between the PDN 230 (or "AF 230") and the PCRF 226.

FIG. 3 illustrates an architecture of a system 300 including a CN 320. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a data network (DN) 303, which may be, for example, operator services, Internet access or 3rd party services; and a 5GC 320. The 5GC 320 may include an authentication server function (AUSF) 322; an access and mobility management function (AMF) 321; a session management function (SMF) 324; a network exposure function (NEF) 323; a policy control function (PCF) 326; a network repository function (NRF) 325; a unified data management (UDM) function 327; an AF 328; a user plane function (UPF) 302; and a network slice selection function (NSSF) 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, ULDL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 using a N4 reference point between the SMF 324 and the UPF 302.

In some examples, the UPF 302 supports Performance Measurement Functionality (PMF), which may be used by the UE 301 to obtain access performance measurements over the user-plane of 3GPP access and/or over the user-plane of non-3GPP access. For example, when the UE 301 requests establishment of a Multiple Access Protocol Data Unit (MA PDU) Session and indicates that it is capable of supporting Access Traffic Steering, Switching and Splitting (ATSSS), the UE may receive Measurement Assistance Information during the establishment of a MA PDU session. This information assists the UE in determining which measurements should be performed over either or both accesses, as well as whether and when measurement reports should to be sent to the network. Measurement Assistance Information can include, for example, the IP address and the UDP port of a PMF in the UPF 302, with which the UE 301 can send PMF protocol messages. Additional details on access network performance measurements are described in clause 5.32.5 of 3GPP Technical Specification (TS) 23.501, the entire content of which is incorporated herein by reference.

In some examples, the following PMF protocol messages can be exchanged between the UE and the PMF: Messages for Round Trip Time (RTT) measurements (e.g., when the "Smallest Delay" steering mode is used); and messages for reporting access availability/unavailability by the UE 301 to the UPF 302. In some examples, such as when the UE requests a MA PDU session and indicates that it is capable of supporting the Multipath TCP (MPTCP) functionality only, the network may not send Measurement Assistance Information, as the UE can use measurements available at the MPTCP layer.

The AUSF 322 stores data for authentication of UE 301 and handle authentication-related functionality. The AUSF 322 may facilitate a common authentication framework for various access types. The AUSF 322 may communicate with the AMF 321 using a N12 reference point between the AMF 321 and the AUSF 322, and may communicate with the UDM 327 using a N13 reference point between the UDM 327 and the AUSF 322. Additionally, the AUSF 322 may exhibit a Nausf service-based interface.

The AMF 321 is responsible for registration management (e.g., for registering UE 301), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent proxy for routing SM messages. AMF 321 may also provide transport for short message service (SMS) messages between UE 301 and a SMS Function (SMSF) (not shown in FIG. 3). AMF 321 may act as security anchor function (SEAF), which may include interaction with the AUSF 322 and the UE 301 to, for example, receive an intermediate key that was established as a result of the UE 301 authentication process. Where universal subscriber identity module (USIM) based authentication is used, the AMF 321 may retrieve the security material from the AUSF 322. AMF 321 may also include a security context management (SCM) function, which receives a key from the SEAF to derive access-network specific keys. Furthermore, AMF 321 may be a termination point of a RAN control plane interface, which may include or be a N2 reference point between the (R)AN 310 and the AMF 321. In some examples, the AMF 321 may be a termination point of NAS (N1) signaling and perform NAS ciphering and integrity protection.

AMF 321 may also support NAS signaling with a UE 301 over a N3 interworking function (IWF) interface (referred to as the "N3IWF"). The N3IWF may be used to provide access to untrusted entities. The N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signaling from the SMF 324 and the AMF 321 for PDU sessions and QoS, encapsulate/de-encapsulate packets for IPsec and N3 tunneling, mark N3 user-plane packets in the uplink, and enforce QoS corresponding to N3 packet marking taking into account QoS requirements associated with such marking received over N2. The N3IWF may also relay uplink and downlink control-plane NAS signaling between the UE 301 and AMF 321 using a N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit a Namf service-based interface, and may be a termination point for a N14 reference point between two AMFs 321 and a N17 reference point between the AMF 321 and a 5G equipment identity registry (EIR) (not shown in FIG. 3).

The UE 301 may register with the AMF 321 in order to receive network services. Registration management (RM) is used to register or deregister the UE 301 with the network (e.g., AMF 321), and establish a UE context in the network (e.g., AMF 321). The UE 301 may operate in a RM-REGISTERED state or an RM-DEREGISTERED state. In the RM DEREGISTERED state, the UE 301 is not registered with the network, and the UE context in AMF 321 holds no valid location or routing information for the UE 301 so the UE 301 is not reachable by the AMF 321. In the RM REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be, for example, a data structure or database object, among others, that indicates or stores a registration state per access type and the periodic update timer. The AMF 321 may also store a 5GC mobility management (MM) context that may be the same or similar to the (E)MM context discussed previously. In some examples, the AMF 321 may store a coverage enhancement mode B Restriction parameter of the UE 301 in an associated MM context or RM context. The AMF 321 may also derive the value, when needed, from the UE's usage setting parameter already stored in the UE context (and/or MM/RM context).

Connection management (CM) may be used to establish and release a signaling connection between the UE 301 and the AMF 321 over the N1 interface. The signaling connection is used to enable NAS signaling exchange between the UE 301 and the CN 320, and includes both the signaling connection between the UE and the AN (e.g., RRC connection or UE-N3IWF connection for non-3GPP access) and the N2 connection for the UE 301 between the AN (e.g., RAN 310) and the AMF 321. In some examples, the UE 301 may operate in one of two CM modes: CM-IDLE mode or CM-CONNECTED mode. When the UE 301 is operating in the CM-IDLE mode, the UE 301 may have no NAS signaling connection established with the AMF 321 over the N1 interface, and there may be (R)AN 310 signaling connection (e.g., N2 or N3 connections, or both) for the UE 301. When the UE 301 is operating in the CM-CONNECTED mode, the UE 301 may have an established NAS signaling connection with the AMF 321 over the N1 interface, and there may be a (R)AN 310 signaling connection (e.g., N2 and/or N3 connections) for the UE 301. Establishment of a N2 connection between the (R)AN 310 and the AMF 321 may cause the UE 301 to transition from the CM-IDLE mode to the CM-CONNECTED mode, and the UE 301 may transition from the CM-CONNECTED mode to the CM-IDLE mode when N2 signaling between the (R)AN 310 and the AMF 321 is released.

The SMF 324 may be responsible for session management (SM), such as session establishment, modify and release, including tunnel maintain between UPF and AN node; UE IP address allocation and management (including optional authorization); selection and control of UP function; configuring traffic steering at the UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent using AMF over N2 to AN; and determining SSC mode of a session. SM may refer to management of a PDU session, and a PDU session (or "session") may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include some or all of the following roaming functionality: handling local enforcement to apply QoS service level agreements (SLAs) (e.g., in VPLMN); charging data collection and charging interface (e.g., in VPLMN); lawful intercept (e.g., in VPLMN for SM events and interface to LI system); and support for interaction with external DN for transport of signaling for PDU session authorization/authentication by external DN. A N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, among others. In some examples, the NEF 323 stores/retrieves information as structured data using a standardized interface (Nudr) to the Unified Data Repository (UDR), and the NEF 323 may authenticate, authorize, and/or throttle the AFs.

The NEF 323 may also translate information exchanged with the AF 328 and information exchanged with internal network functions. For example, the NEF 323 may translate between an AF-Service-Identifier and an internal 5GC information. The NEF 323 may also receive information from other network functions (NFs) based on exposed capabilities of other NFs. This information may be stored at the NEF 323 as structured data, or at a data storage NF using standardized interfaces. The stored information can then be re-exposed by the NEF 323 to other NFs and AFs, or used for other purposes such as analytics, or both. Additionally, the NEF 323 may exhibit a Nnef service-based interface.

In particular, in some examples, the NEF 323 handles masking of network and user sensitive information to external AFs (e.g., AFs 328) according to a network policy. The NEF 323 may also support a Packet Flow Description (PFD) Function, which may store and retrieve PFD(s) in the UDR and provides PFD(s) to the SMF 324 on the request of the SMF 324 (sometimes referred to as "pull mode"), or on the request of PFD management from the NEF 328 (sometimes referred to as "push mode"), as described in 3GPP TS 23.503, the entire content of which is incorporated herein by reference.

In some examples, the NEF 323 provides a means for the AF 328 to securely provide information to a 3GPP network (e.g., Expected UE Behavior, 5GLAN group information, or service specific information, or combinations of them, among other information). In this example, the NEF may authenticate and authorize and assist in throttling the AFs 328.

In some examples, the NEF 323 may provide one or a combination of two or more of the functions or services summarized below in Table 1 and described in 3GPP TS 23.502, the entire content of which is incorporated herein by reference.

is one type of capability exposed by a NF (e.g., a NF Service Producer) to another authorized NF (e.g., a NF Service Consumer) through a service-based interface. A NF may expose one or more NF services. Each of the NF services offered by a NF are self-contained, reusable, and use management schemes independently of other NF services offered by the same NF (e.g., for scaling, healing, etc.). A consumer having selected a NF service instance within a NF instance may re-select another service instance of the same NF service within that same NF instance and get the same results as if the original selected NF service instance was used. Re-selecting may be needed if the service consumer fails to contact the original NF service instance.

In some examples, each NF service is accessible by means of an interface. An interface comprises one or several operations. NF services may communicate directly between NF Service Consumers and NF Service Producers, or indirectly via a Service Communication Proxy (SCP). Whether a NF Service Consumer uses direct or indirect communication can be based on the configuration of the NF Service Consumer. In direct communication, the NF Service Consumer performs discovery of the target NF Service producer by local configuration or via NRF. Then, the NF Service Consumer communicates with the target NF Service Producer directly. In indirect communication, the NF Service Consumer communicates with the target NF Service pro-

TABLE 1

Example NE Services provided by NEF

| Service Name | Description | Clause in 3GPP TS 23.502 |
| --- | --- | --- |
| Nnef_EventExposure | Provides support for event exposure | 5.2.6.2 |
| Nnef_PFDManagement | Provides support for PEDs management | 5.2.6.3 |
| Nnef_ParameterProvision | Provides support to provision information which can be used for the UE in 5GS | 5.2.6.4 |
| Nnef_Trigger | Provides support for device triggering | 5.2.6.5 |
| Nnef_BDTPNegotiation | Provides support for background data transfer policy negotiation and optionally notification for the renegotiation. | 5.2.6.6 |
| Nnef_TrafficInfluence | Provide the ability to influence traffic routing. | 5.2.6.7 |
| Nnef_ChargeableParty | Requests to become the chargeable party for a data session for UE. | 5.2.6.8 |
| Nnef_AFsessionWithQoS | Requests the network to provide a specific QoS for an AS session. | 5.2.6.9 |
| Nnef_ServiceParameter | Provides support to provision service specific information | 5.2.6.11 |
| Nnef_APISupportCapability | Provides support for awareness on availability or expected level of a service API | 5.2.6.12 |
| Nnef_AnalyticsExposure | Provides support for exposure of network analytics | 5.2.6.16 |

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

In general, NFs may offer different capabilities, and thus different NF services to distinct consumers. An NF service ducer via a SCP. The NF Service Consumer may be configured to perform discovery of the target NF Service Producer directly, or delegate the discovery of the target NF Service Producer to the SCP used for indirect communication. In the latter case, the SCP uses the parameters provided by NF Service Consumer to perform discovery and/or selection of the target NF Service Producer. The SCP address may be locally configured in or by the NF Service Consumer.

In some examples, if the end point address provided by a NF Service Producer points to a specific target NF Producer/ NF Service Producer instance within a set, the NF Consumer or SCP may re-select another service instance of the same NF service within the same NF service set in that same NF instance, or another NF instance in the same NF Set for subsequent transaction, and get the same results as if the original selected NF service instance was used. Re-selecting may be used, for example, if the requester NF fails to contact the original NF service instance. If the end point address provided by the NF Service Producer points to an NF set or NF service set, the NF Consumer or SCP is allowed to reselect a different NF service instance of the same NF service within that same set for the UE and its subsequent transaction. System procedures can be built by invocation of a number of NF services (e.g., as specified in 3GPP TS 23.502).

The PCF 326 may provide policy rules to control plane function(s) to enforce them, and may also support unified policy framework to govern network behavior. The PCF 326 may also implement a front end to access subscription information relevant for policy decisions in a unified data repository (UDR) of the UDM 327. The PCF 326 may communicate with the AMF 321 using an N15 reference point between the PCF 326 and the AMF 321, which may include a PCF 326 in a visited network and the AMF 321 in case of roaming scenarios. The PCF 326 may communicate with the AF 328 using a N5 reference point between the PCF 326 and the AF 328; and with the SMF 324 using a N7 reference point between the PCF 326 and the SMF 324. The system 300 or CN 320, or both, may also include a N24 reference point between the PCF 326 (in the home network) and a PCF 326 in a visited network. Additionally, the PCF 326 may exhibit a Npcf service-based interface.

The UDM 327 may handle subscription-related information to support the network entities' handling of communication sessions, and may store subscription data of UE 301. For example, subscription data may be communicated between the UDM 327 and the AMF 321 using a N8 reference point between the UDM 327 and the AMF. The UDM 327 may include two parts, an application front end and a UDR (the front end and UDR are not shown in FIG. 3). The UDR may store subscription data and policy data for the UDM 327 and the PCF 326, or structured data for exposure and application data (including PFDs for application detection, application request information for multiple UEs 301) for the NEF 323, or both. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM front end, which is in charge of processing credentials, location management, subscription management and so on. Several different front ends may serve the same user in different transactions. The UDM front end accesses subscription information stored in the UDR and performs authentication credential processing, user identification handling, access authorization, registration/mobility management, and subscription management. The UDR may interact with the SMF 324 using a N10 reference point between the UDM 327 and the SMF 324. UDM 327 may also support SMS management, in which an SMS front end implements the similar application logic as discussed previously. Additionally, the UDM 327 may exhibit the Nudm service-based interface.

The AF 328 may provide application influence on traffic routing, provide access to the network capability exposure (NCE), and interact with the policy framework for policy control. The NCE may be a mechanism that allows the 5GC 320 and AF 328 to provide information to each other using NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 using the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit a Naf service-based interface.

The NSSF 329 may select a set of network slice instances serving the UE 301. The NSSF 329 may also determine allowed NSSAI and the mapping to the subscribed single network slice selection assistance information (S-NSSAI), if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 using an N22 reference point between AMF 321 and NSSF 329; and may communicate with another NSSF 329 in a visited network using a N31 reference point (not shown by FIG. 3). Additionally, the NSSF 329 may exhibit a Nnssf service-based interface.

As discussed previously, the CN 320 may include an SMSF, which may be responsible for SMS subscription checking and verification, and relaying SM messages to or from the UE 301 to or from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown in FIG. 3, such as a data storage system, a 5G-EIR, a security edge protection proxy (SEPP), and the like. The data storage system may include a structured data storage function (SDSF), an unstructured data storage function (UDSF), or both, among others. Any network function may store and retrieve unstructured data to or from the UDSF (e.g., UE contexts), using a N18 reference point between any NF and the UDSF (not shown in FIG. 3). Individual network functions may share a UDSF for storing their respective unstructured data or individual network functions may each have their own UDSF located at or near the individual network functions. Additionally, the UDSF may exhibit a Nudsf service-based interface (not shown in FIG. 3). The 5G-EIR may be a network function that checks the status of permanent equipment identifiers (PEI) for determining whether particular equipment or entities are blacklisted from the network.

The SEPP may be a non-transparent proxy that performs topology hiding, message filtering, and policing on inter-PLMN control plane interfaces. The SEPP protects the connection between Service Consumers and Service Producers from a security perspective. For example, the SEPP does not duplicate the Service Authorization applied by the Service Producers as specified in clause 7.1.4 of 3GPP TS 23.501. Detailed functionality of the SEPP, related flows, and the N32 reference point, are specified in 3GPP TS 33.501. In some examples, the SEPP applies the aforementioned functionality to each Control Plane message in inter-PLMN signaling, acting as a service relay between the actual Service Producer and the actual Service Consumer. For both Service Producer and Consumer, the result of the service relaying is equivalent to a direct service interaction. Every Control Plane message in inter-PLMN signaling between the SEPPs may pass via IPX entities. More details on SEPPs and the IPX entities are described in 3GPP TS 33.501 and TS 29.500, the entire contents of each of which is incorporated herein by reference.

In some examples, there may be additional or alternative reference points or service-based interfaces, or both, between the network function services in the network functions. However, these interfaces and reference points have been omitted from FIG. 3 for clarity. In one example, the CN 320 may include a Nx interface, which is an inter-CN interface between the MME (e.g., MME 221) and the AMF 321 in order to enable interworking between CN 320 and CN 220. Other example interfaces or reference points may include a N5g-EIR service-based interface exhibited by a 5G-EIR, a N27 reference point between the NRF in the visited network and the NRF in the home network, or a N31 reference point between the NSSF in the visited network and the NSSF in the home network, among others.

Figure 4:
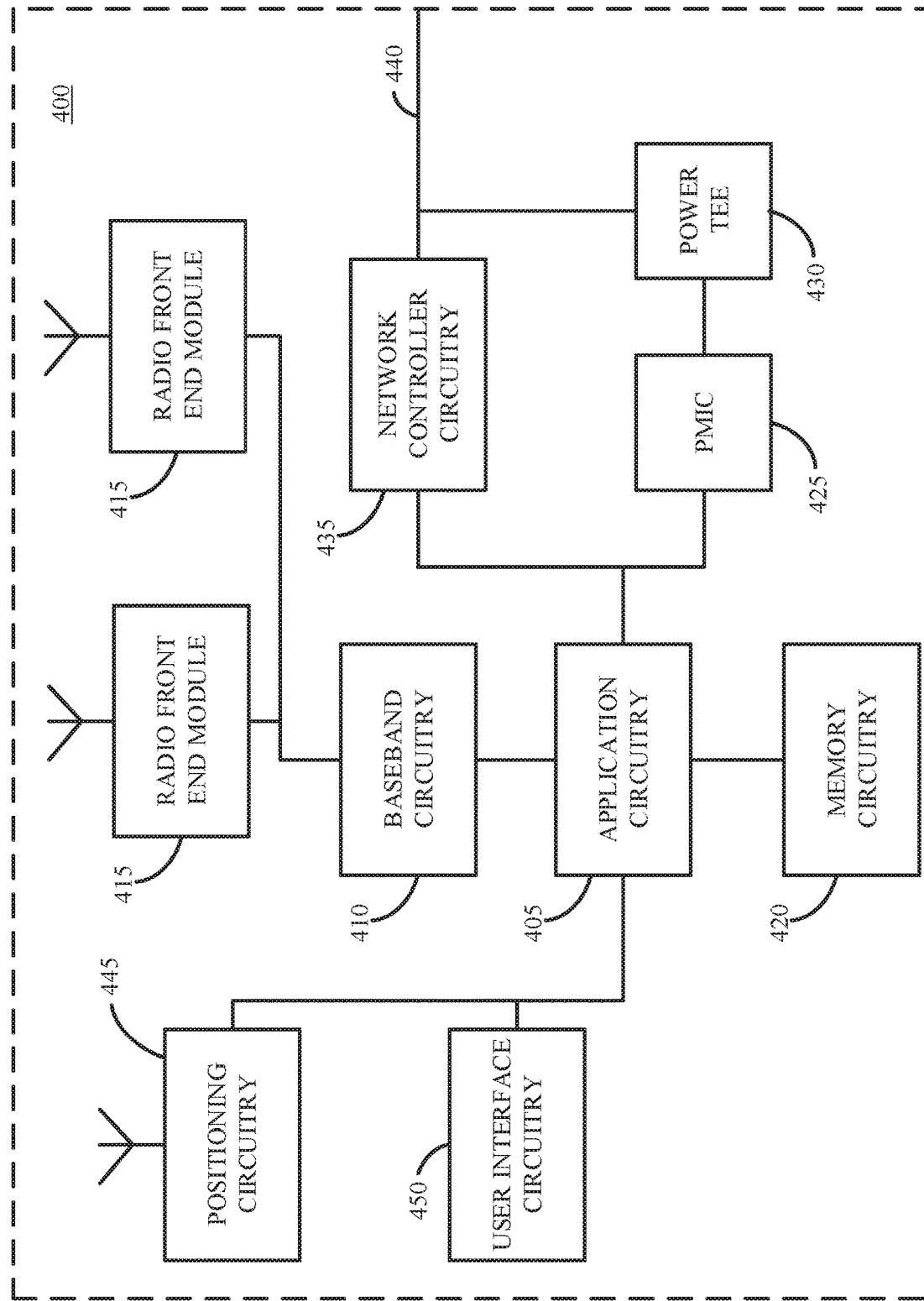
FIG. 4 illustrates an example of infrastructure equipment.

FIG. 4 illustrates an example of infrastructure equipment 400. The infrastructure equipment 400 (or "system 400") may be implemented as a base station, a radio head, a RAN node, such as the RAN nodes 111 or AP 106 shown and described previously, an application server(s) 130, or any other component or device described herein. In other examples, the system 400 can be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some examples, the system 400 may include additional elements such as, for example, memory, storage, a display, a camera, one or more sensors, or an input/output (I/O) interface, or combinations of them, among others. In other examples, the components described with reference to the system 400 may be included in more than one device. For example, the various circuitries may be separately included in more than one device for CRAN, vBBU, or other implementations.

The application circuitry 405 includes circuitry such as, but not limited to, one or more processors (or processor cores), cache memory, one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory or storage elements and may be configured to execute instructions stored in the memory or storage to enable various applications or operating systems to run on the system 400. In some examples, the memory or storage elements may include on-chip memory circuitry, which may include any suitable volatile or non-volatile memory, such as DRAM, SRAM, EPROM, EEPROM, Flash memory, solid-state memory, or combinations of them, among other types of memory.

The processor(s) of the application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or combinations of them, among others. In some examples, the application circuitry 405 may include, or may be, a special-purpose processor or controller configured to carry out the various techniques described here. As examples, the processor(s) of application circuitry 405 may include one or more Apple A-series processors, Intel Pentium®, Core®, or Xeon® processor(s): Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some examples, the system 400 may not utilize application circuitry 405, and instead may include a special-purpose processor or controller to process IP data received from an EPC or 5GC, for example.

In some examples, the application circuitry 405 may include one or more hardware accelerators, which may be microprocessors, programmable processing devices, or the like. The one or more hardware accelerators may include, for example, computer vision (CV) or deep learning (DL) accelerators, or both. In some examples, the programmable processing devices may be one or more a field-programmable devices (FPDs) such as field-programmable gate arrays (FPGAs) and the like; programmable logic devices (PLDs) such as complex PLDs (CPLDs) or high-capacity PLDs (HCPLDs); ASICs such as structured ASICs; programmable SoCs (PSoCs), or combinations of them, among others. In such implementations, the circuitry of application circuitry 405 may include logic blocks or logic fabric, and other interconnected resources that may be programmed to perform various functions, such as the procedures, methods, functions described herein. In some examples, the circuitry of application circuitry 405 may include memory cells (e.g., erasable programmable read-only memory (EPROM), electrically erasable programmable read-only memory (EEPROM), flash memory, static memory (e.g., static random access memory (SRAM) or anti-fuses)) used to store logic blocks, logic fabric, data, or other data in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed with regard to FIG. 6.

The user interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, or combinations of them, among others. Peripheral component interfaces may include, but are not limited to, a nonvolatile memory port, a universal serial bus (USB) port, an audio jack, a power supply interface, among others.

The radio front end modules (RFEMs) 415 may include a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some examples, both mmWave and sub-mmWave radio functions may be implemented in the same physical RFEM 415, which incorporates both mmWave antennas and sub-mmWave.

The memory circuitry 420 may include one or more of volatile memory, such as dynamic random access memory (DRAM) or synchronous dynamic random access memory (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. In some examples, the memory circuitry 420 may include three-dimensional (3D) cross-point (XPOINT) memories from Intel® and Micron®. Memory circuitry 420 may be implemented as one or more of solder down packaged integrated circuits, socketed memory modules and plug-in memory cards, for example.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to and from the infrastructure equipment 400 using network interface connector 440 using a physical connection, which may be electrical (commonly referred to as a "copper interconnect"), optical, or wireless. The network controller circuitry 435 may include one or more dedicated processors or FPGAs, or both, to communicate using one or more of the aforementioned protocols. In some examples, the network controller circuitry 435 may include multiple controllers to provide connectivity to other networks using the same or different protocols.

The positioning circuitry 445 includes circuitry to receive and decode signals transmitted or broadcasted by a positioning network of a global navigation satellite system (GNSS). Examples of a GNSS include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS)), among other systems. The positioning circuitry 445 can include various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 445 may include a Micro-Technology for Positioning, Navigation, and Timing (Micro-PNT) IC that uses a master timing clock to perform position tracking and estimation without GNSS assistance. The positioning circuitry 445 may also be part of, or interact with, the baseband circuitry 410 or RFEMs 415, or both, to communicate with the nodes and components of the positioning network. The positioning circuitry 445 may also provide data (e.g., position data, time data) to the application circuitry 405, which may use the data to synchronize operations with various infrastructure (e.g., RAN nodes 111).

The components shown by FIG. 4 may communicate with one another using interface circuitry, which may include any number of bus or interconnect (IX) technologies such as industry standard architecture (ISA), extended ISA (EISA), peripheral component interconnect (PCI), peripheral component interconnect extended (PCIx), PCI express (PCIe), or any number of other technologies. The bus or IX may be a proprietary bus, for example, used in a SoC based system. Other bus or IX systems may be included, such as an I2C interface, an SPI interface, point to point interfaces, and a power bus, among others.

Figure 5:
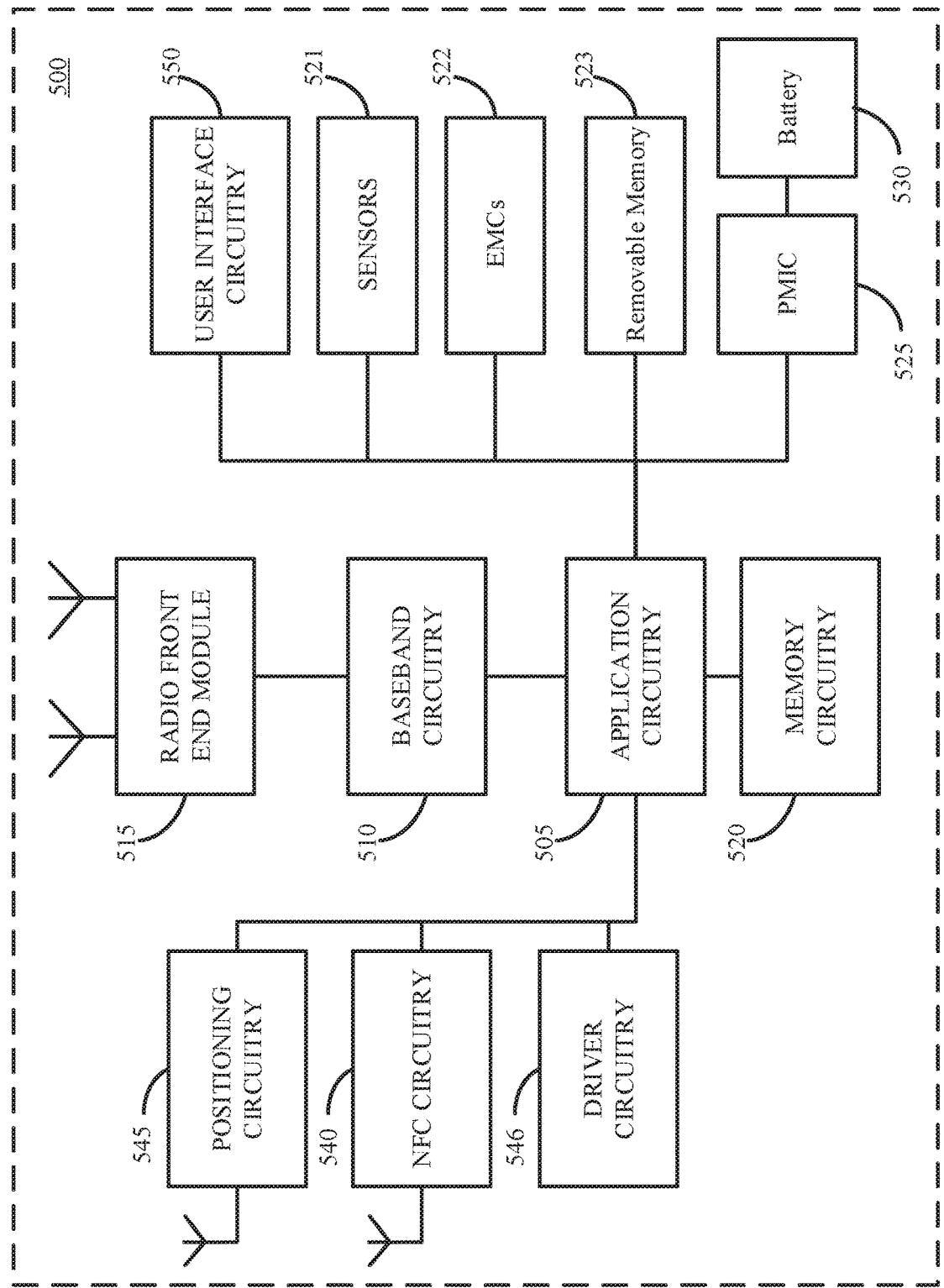
FIG. 5 illustrates an example of a platform or device.

FIG. 5 illustrates an example of a platform 500 (or "device 500"). In some examples, the computer platform 500 may be suitable for use as UEs 101, 201, 301, application servers 130, or any other component or device discussed herein. The platform 500 may include any combinations of the components shown in the example. The components of platform 500 (or portions thereof) may be implemented as integrated circuits (ICs), discrete electronic devices, or other modules, logic, hardware, software, firmware, or a combination of them adapted in the computer platform 500, or as components otherwise incorporated within a chassis of a larger system. The block diagram of FIG. 5 is intended to show a high level view of components of the platform 500. However, in some examples, the platform 500 may include fewer, additional, or alternative components, or a different arrangement of the components shown in FIG. 5.

The application circuitry 505 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory or storage to enable various applications or operating systems to run on the system 500. In some examples, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the application circuitry 405 may include, or may be, a special-purpose processor/controller to carry out the techniques described herein.

As examples, the processor(s) of application circuitry 505 may include an Apple A-series processor. The processors of the application circuitry 1105 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some examples, the application circuitry 505 may be a part of a system on a chip (SoC) in which the application circuitry 505 and other components are formed into a single integrated circuit, or a single package.

Additionally or alternatively, the application circuitry 505 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the application circuitry 505 may include logic blocks or logic fabric, and other interconnected resources that may be programmed to perform various functions, such as the procedures, methods, functions described herein. In some examples, the application circuitry 505 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed with regard to FIG. 6.

The RFEMs 515 may comprise a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays (see, e.g., antenna array 611 of FIG. 6), and the RFEM may be connected to multiple antennas. In some examples, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, or soldered onto a motherboard using a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, for example, a solid state disk drive (SSDD), hard disk drive (HDD), a micro HDD, resistance change memories, phase change memories, holographic memories, or chemical memories, among others. In some examples, the computer platform 500 may incorporate the three-dimensional (3D) cross-point (XPOINT) memories from Intel® and Micron®.

The removable memory circuitry 523 may include devices, circuitry, enclosures, housings, ports or receptacles, among others, used to couple portable data storage devices with the platform 500. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others.

The platform 500 may also include interface circuitry (not shown) for connecting external devices with the platform 500. The external devices connected to the platform 500 using the interface circuitry include sensor circuitry 521 and electromechanical components (EMCs) 522, as well as removable memory devices coupled to removable memory circuitry 523.

The sensor circuitry 521 include devices, modules, or subsystems whose purpose is to detect events or changes in its environment and send the information (e.g., sensor data) about the detected events to one or more other devices, modules, or subsystems. Examples of such sensors include inertial measurement units (IMUs) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors: gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 522 include devices, modules, or subsystems whose purpose is to enable the platform 500 to change its state, position, or orientation, or move or control a mechanism, system, or subsystem. Additionally, the EMCs 522 may be configured to generate and send messages or signaling to other components of the platform 500 to indicate a current state of the EMCs 522. Examples of the EMCs 522 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electromechanical components. In some examples, the platform 500 is configured to operate one or more EMCs 522 based on one or more captured events, instructions, or control signals received from a service provider or clients, or both.

In some examples, the interface circuitry may connect the platform 500 with positioning circuitry 545. The positioning circuitry 545 includes circuitry to receive and decode signals transmitted or broadcasted by a positioning network of a GNSS. Examples of a GNSS include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, among other systems. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 545 may include a Micro-PNT IC that uses a master timing clock to perform position tracking or estimation without GNSS assistance. The positioning circuitry 545 may also be part of, or interact with, the baseband circuitry 410 or RFEMs 515, or both, to communicate with the nodes and components of the positioning network. The positioning circuitry 545 may also provide data (e.g., position data, time data) to the application circuitry 505, which may use the data to synchronize operations with various infrastructure (e.g., radio base stations), for turn-by-turn navigation applications, or the like.

In some examples, the interface circuitry may connect the platform 500 with Near-Field Communication (NFC) circuitry 540. The NFC circuitry 540 is configured to provide contactless, short-range communications based on radio frequency identification (RFID) standards, in which magnetic field induction is used to enable communication between NFC circuitry 540 and NFC-enabled devices external to the platform 500 (e.g., an "NFC touchpoint"). The NFC circuitry 540 includes an NFC controller coupled with an antenna element and a processor coupled with the NFC controller. The NFC controller may be a chip or IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, the driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may be included when the platform 500 is capable of being powered by a battery 530, for example, when the device is included in a UE 101, 201, 301.

In some examples, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback or handover. This can allow the platform 500 to enter a very low power state, where it periodically wakes up to listen to the network and then powers down again. In some examples, the platform 500 may not receive data in the RRC_Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 530 may power the platform 500, although in some examples the platform 500 may be deployed in a fixed location, and may have a power supply coupled to an electrical grid. The battery 530 may be a lithium ion battery, a metal-air battery, such as a zinc-air battery, an aluminum-air battery, or a lithium-air battery, among others. In some examples, such as in V2X applications, the battery 530 may be a typical lead-acid automotive battery.

In some examples, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, or sensing frequency, among others.

A power block, or other power supply coupled to an electrical grid may be coupled with the BMS to charge the battery 530. In some examples, the power block 530 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

The user interface circuitry 550 includes various input/output (110) devices present within, or connected to, the platform 500, and includes one or more user interfaces designed to enable user interaction with the platform 500 or peripheral component interfaces designed to enable peripheral component interaction with the platform 500. The user interface circuitry 550 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LED displays, quantum dot displays, or projectors), with the output of characters, graphics, or multimedia objects being generated or produced from the operation of the platform 500. The output device circuitry may also include speakers or other audio emitting devices, or printer(s). In some examples, the sensor circuitry 521 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces may include, but are not limited to, a non-volatile memory port, a USB port, an audio jack, or a power supply interface.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 6:
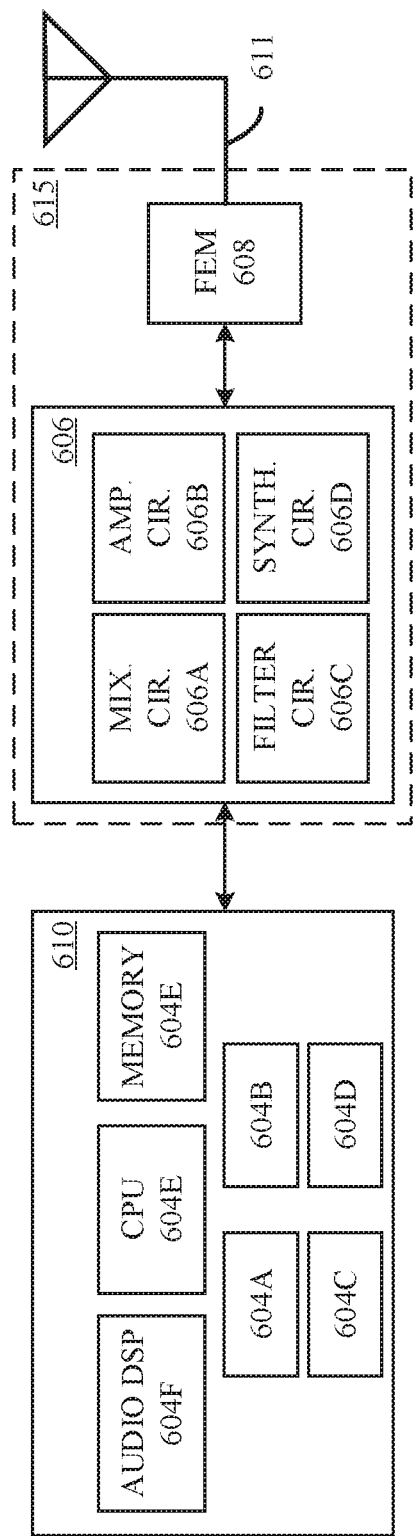
FIG. 6 illustrates example components of baseband circuitry and radio front end circuitry.

FIG. 6 illustrates example components of baseband circuitry 610 and radio front end modules (RFEM) 615. The baseband circuitry 610 can correspond to the baseband circuitry 410 and 510 of FIGS. 4 and 5, respectively. The RFEM 615 can correspond to the RFEM 415 and 515 of FIGS. 4 and 5, respectively. As shown, the RFEMs 615 may include Radio Frequency (RF) circuitry 606, front-end module (FEM) circuitry 608, antenna array 611 coupled together.

The baseband circuitry 610 includes circuitry or control logic, or both, configured to carry out various radio or network protocol and control functions that enable communication with one or more radio networks using the RF circuitry 606. The radio control functions may include, but are not limited to, signal modulation and demodulation, encoding and decoding, and radio frequency shifting. In some examples, modulation and demodulation circuitry of the baseband circuitry 610 may include Fast-Fourier Transform (FFT), precoding, or constellation mapping and demapping functionality. In some examples, encoding and decoding circuitry of the baseband circuitry 610 may include convolution, tail-biting convolution, turbo, Viterbi, or Low Density Parity Check (LDPC) encoder and decoder functionality. Modulation and demodulation and encoder and decoder functionality are not limited to these examples and may include other suitable functionality in other examples. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry (e.g., the application circuitry 405, 505 shown in FIGS. 4 and 5) for generation and processing of the baseband signals and for controlling operations of the RF circuitry 606. The baseband circuitry 610 may handle various radio control functions.

The aforementioned circuitry and control logic of the baseband circuitry 610 may include one or more single or multi-core processors. For example, the one or more processors may include a 3G baseband processor 604A, a 4G or LTE baseband processor 604B, a 5G or NR baseband processor 604C, or some other baseband processor(s) 604D for other existing generations, generations in development or to be developed in the future (e.g., sixth generation (6G)). In some examples, some or all of the functionality of baseband processors 604A-D may be included in modules stored in the memory 604G and executed using a Central Processing Unit (CPU) 604E. In some examples, some or all of the functionality of baseband processors 604A-D may be provided as hardware accelerators (e.g., FPGAs or ASICs) loaded with the appropriate bit streams or logic blocks stored in respective memory cells. In some examples, the memory 604G may store program code of a real-time OS (RTOS) which, when executed by the CPU 604E (or other baseband processor), is to cause the CPU 604E (or other baseband processor) to manage resources of the baseband circuitry 610, schedule tasks, or carry out other operations. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio digital signal processor(s) (DSP) 604F. The audio DSP(s) 604F include elements for compression and decompression and echo cancellation and may include other suitable processing elements in some examples.

In some examples, each of the processors 604A-604E include respective memory interfaces to send and receive data to and from the memory 604G. The baseband circuitry 610 may further include one or more interfaces to communicatively couple to other circuitries or devices, such as an interface to send and receive data to and from memory external to the baseband circuitry 610; an application circuitry interface to send and receive data to and from the application circuitry 405, 505 of FIGS. 4 and 6); an RF circuitry interface to send and receive data to and from RF circuitry 606 of FIG. 6; a wireless hardware connectivity interface to send and receive data to and from one or more wireless hardware elements (e.g., Near Field Communication (NFC) components, Bluetooth®/Bluetooth® Low Energy components, Wi-Fi® components, and/or the like); and a power management interface to send and receive power or control signals to and from the PMIC 525.

In some examples (which may be combined with the above described examples), the baseband circuitry 610 includes one or more digital baseband systems, which are coupled with one another using an interconnect subsystem and to a CPU subsystem, an audio subsystem, and an interface subsystem. The digital baseband subsystems may also be coupled to a digital baseband interface and a mixed-signal baseband subsystem using another interconnect subsystem. Each of the interconnect subsystems may include a bus system, point-to-point connections, network-on-chip (NOC) structures, or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, among other components. In some examples, the baseband circuitry 610 may include protocol processing circuitry with one or more instances of control circuitry (not shown) to provide control functions for the digital baseband circuitry or radio frequency circuitry (e.g., the radio front end modules 615).

Although not shown in FIG. 6, in some examples, the baseband circuitry 610 includes individual processing device(s) to operate one or more wireless communication protocols (e.g., a "multi-protocol baseband processor" or "protocol processing circuitry") and individual processing device(s) to implement PHY layer functions. In some examples, the PHY layer functions include the aforementioned radio control functions. In some examples, the protocol processing circuitry operates or implements various protocol layers or entities of one or more wireless communication protocols. For example, the protocol processing circuitry may operate LTE protocol entities or 5G NR protocol entities, or both, when the baseband circuitry 610 or RF circuitry 606, or both, are part of mmWave communication circuitry or some other suitable cellular communication circuitry. In this example, the protocol processing circuitry can operate MAC, RLC, PDCP, SDAP, RRC, and NAS functions. In some examples, the protocol processing circuitry may operate one or more IEEE-based protocols when the baseband circuitry 610 or RF circuitry 606, or both, are part of a Wi-Fi communication system. In this example, the protocol processing circuitry can operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In some examples, the components of the baseband circuitry 610 may be suitably combined in a single chip or chipset, or disposed on a same circuit board. In some examples, some or all of the constituent components of the baseband circuitry 610 and RF circuitry 606 may be implemented together such as, for example, a system on a chip (SoC) or System-in-Package (SiP). In some examples, some or all of the constituent components of the baseband circuitry 610 may be implemented as a separate SoC that is communicatively coupled with and RF circuitry 606 (or multiple instances of RF circuitry 606). In some examples, some or all of the constituent components of the baseband circuitry 610 and the application circuitry 405, 505 may be implemented together as individual SoCs mounted to a same circuit board (e.g., a "multi-chip package").

In some examples, the baseband circuitry 610 may provide for communication compatible with one or more radio technologies. For example, the baseband circuitry 610 may support communication with an E-UTRAN or other WMAN, a WLAN, or a WPAN. Examples in which the baseband circuitry 610 is configured to support radio communications of more than one wireless protocol may be referred to as multi-mode baseband circuitry.

The RF circuitry 606 may enable communication with wireless networks using modulated electromagnetic radiation through a non-solid medium. In some examples, the RF circuitry 606 may include switches, filters, or amplifiers, among other components, to facilitate the communication with the wireless network. The RF circuitry 606 may include a receive signal path, which may include circuitry to down-convert RF signals received from the FEM circuitry 608 and provide baseband signals to the baseband circuitry 610. The RF circuitry 606 may also include a transmit signal path, which may include circuitry to up-convert baseband signals provided by the baseband circuitry 610 and provide RF output signals to the FEM circuitry 608 for transmission.

The receive signal path of the RF circuitry 606 includes mixer circuitry 606a, amplifier circuitry 606b and filter circuitry 606c. In some examples, the transmit signal path of the RF circuitry 606 may include filter circuitry 606c and mixer circuitry 606a. The RF circuitry 606 also includes synthesizer circuitry 606d for synthesizing a frequency for use by the mixer circuitry 606a of the receive signal path and the transmit signal path. In some examples, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some examples, the output baseband signals may be zero-frequency baseband signals, although this is not a requirement.

In some examples, the mixer circuitry 606a of the receive signal path may comprise passive mixers.

In some examples, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some examples, the mixer circuitry 606a of the receive signal path and the mixer circuitry 606a of the transmit signal path may include two or more mixers and may be arranged for quadrature downconversion and upconversion, respectively. In some examples, the mixer circuitry 606a of the receive signal path and the mixer circuitry 606a of the transmit signal path may include two or more mixers and may be arranged for image rejection (e.g., Hartley image rejection). In some examples, the mixer circuitry 606a of the receive signal path and the mixer circuitry 606a of the transmit signal path may be arranged for direct downconversion and direct upconversion, respectively. In some examples, the mixer circuitry 606a of the receive signal path and the mixer circuitry 606a of the transmit signal path may be configured for super-heterodyne operation.

In some examples, the output baseband signals and the input baseband signals may be analog baseband signals. In some examples, the output baseband signals and the input baseband signals may be digital baseband signals, and the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode examples, a separate radio IC circuitry may be provided for processing signals for each spectrum, although the techniques described here are not limited in this respect.

In some examples, the synthesizer circuitry 606d may be a fractional-N synthesizer or a fractional N/N+1 synthesizer, although other types of frequency synthesizers may used. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some examples, the synthesizer circuitry 606d may be a fractional N/N+1 synthesizer.

In some examples, frequency input may be provided by a voltage controlled oscillator (VCO), although that is not a requirement. Divider control input may be provided by either the baseband circuitry 610 or the application circuitry 405/505 depending on the desired output frequency. In some examples, a divider control input (e.g., N) may be determined from a look-up table based on a channel indicated by the application circuitry 405, 505.

The synthesizer circuitry 606d of the RF circuitry 606 may include a divider, a delay-locked loop (DLL), a multiplexer and a phase accumulator. In some examples, the divider may be a dual modulus divider (DMD) and the phase accumulator may be a digital phase accumulator (DPA). In some examples, the DMD may be configured to divide the input signal by either N or N+1 (e.g., based on a carry out) to provide a fractional division ratio. In some examples, the DLL may include a set of cascaded, tunable, delay elements, a phase detector, a charge pump and a D-type flip-flop. The delay elements may be configured to break a VCO period up into Nd equal packets of phase, where Nd is the number of delay elements in the delay line. In this way, the DLL provides negative feedback to help ensure that the total delay through the delay line is one VCO cycle.

In some examples, synthesizer circuitry 606d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some examples, the output frequency may be a LO frequency (fLO). In some examples, the RF circuitry 606 may include an IQ or polar converter.

The FEM circuitry 608 may include a receive signal path, which may include circuitry configured to operate on RF signals received from antenna array 611, amplify the received signals and provide the amplified versions of the received signals to the RF circuitry 606 for further processing. The FEM circuitry 608 may also include a transmit signal path, which may include circuitry configured to amplify signals for transmission provided by the RF circuitry 606 for transmission by one or more of antenna elements of antenna array 611. The amplification through the transmit or receive signal paths may be done solely in the RF circuitry 606, solely in the FEM circuitry 608, or in both the RF circuitry 606 and the FEM circuitry 608.

In some examples, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted using the antenna elements of the antenna array 611 including one or more antenna elements (not shown). The antenna elements may be omnidirectional, directional, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed as a patch of metal foil (e.g., a patch antenna) in a variety of shapes, and may be coupled with the RF circuitry 606 and/or FEM circuitry 608 using metal transmission lines or the like.

Processors of the application circuitry 405/505 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 405, 505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
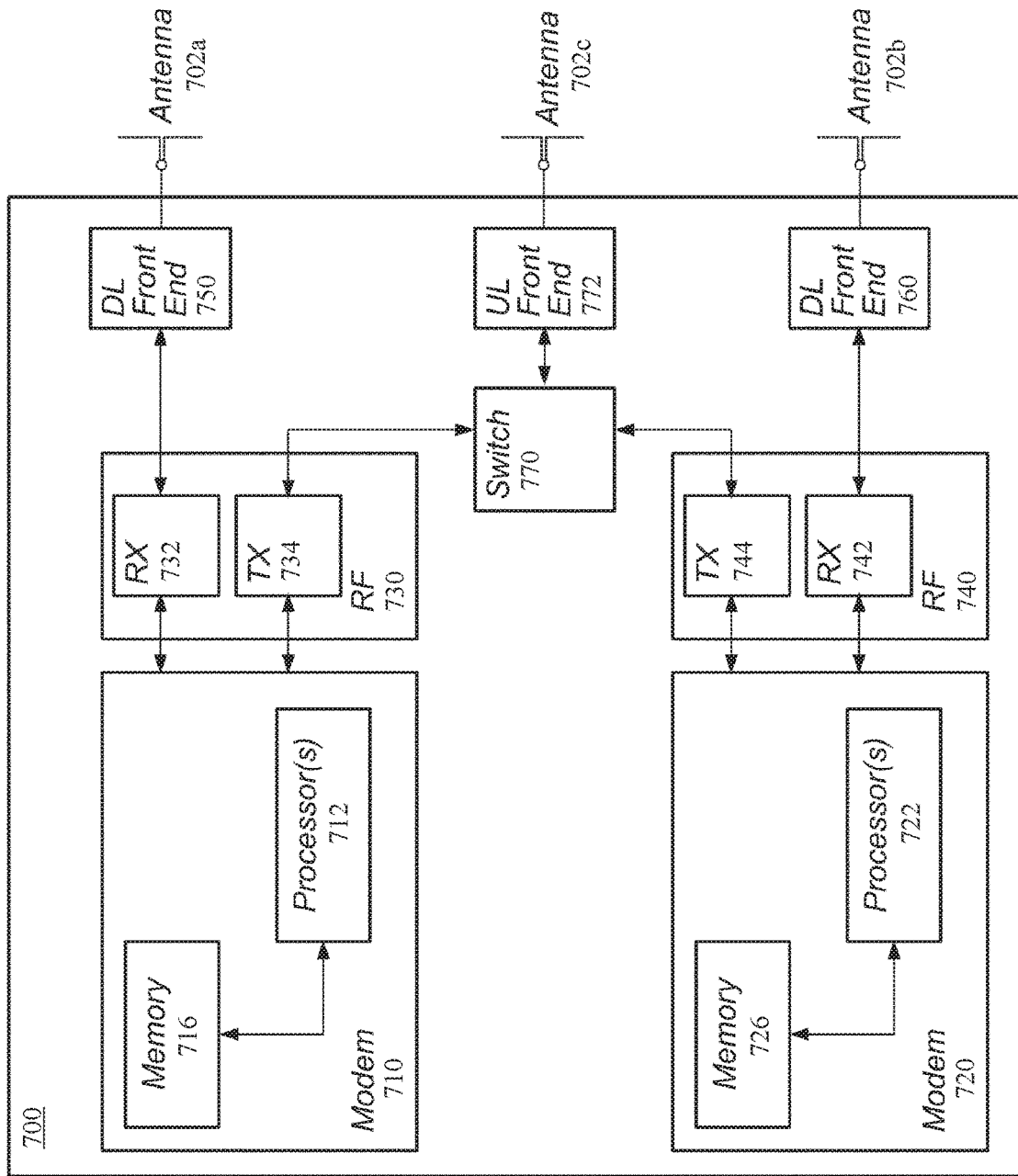
FIG. 7 illustrates example components of cellular communication circuitry.

FIG. 7 illustrates example components of communication circuitry 700. In some examples, the communication circuitry 700 may be implemented as part of the system 400 or the platform 500 shown in FIGS. 4 and 5. The communication circuitry 700 may be communicatively coupled (e.g., directly or indirectly) to one or more antennas, such as antennas 702a-c. In some examples, the communication circuitry 700 includes or is communicatively coupled to dedicated receive chains, processors, or radios, or combinations of them, for multiple RATs (e.g., a first receive chain for LTE and a second receive chain for 5G NR). For example, as shown in FIG. 7, the communication circuitry 700 includes a modem 710 and a modem 720, which may correspond to or be a part of the baseband circuitry 410 and 510 of FIGS. 4 and 5. The modem 710 may be configured for communications according to a first RAT, such as LTE or LTE-A, and the modem 720 may be configured for communications according to a second RAT, such as 5G NR.

The modem 710 includes one or more processors 712 and a memory 716 in communication with the processors 712. The modem 710 is in communication with a radio frequency (RF) front end 730, which may correspond to or be a part of to the RFEM 415 and 515 of FIGS. 4 and 5. The RF front end 730 may include circuitry for transmitting and receiving radio signals. For example, the RF front end 730 includes receive circuitry (RX) 732 and transmit circuitry (TX) 734. In some examples, the receive circuitry 732 is in communication with a DL front end 750, which may include circuitry for receiving radio signals from the antenna 702a. A switch 770 may selectively couple the modem 710 to an UL front end 772, which may include circuitry for transmitting radio signals using the antenna 702c.

Similarly, the modem 720 includes one or more processors 722 and a memory 726 in communication with the processors 722. The modem 720 is in communication with an RF front end 740, which may correspond to or be a part of to the RFEM 415 and 515 of FIGS. 4 and 5. The RF front end 740 may include circuitry for transmitting and receiving radio signals. For example, the RF front end 740 includes receive circuitry 742 and transmit circuitry 744. In some examples, the receive circuitry 742 is in communication with a DL front end 760, which may include circuitry for receiving radio signals from the antenna 702b. The switch 770 may selectively couple the modem 720 to the UL front end 772 for transmitting radio signals using the antenna 702c.

The modem 710 may include hardware and software components for time division multiplexing UL data (e.g., for NSA NR operations), as well as the various other techniques described herein. The processors 712 may include one or more processing elements configured to implement various features described herein, such as by executing program instructions stored on the memory 716 (e.g., a non-transitory computer-readable memory medium). In some examples, the processor 712 may be configured as a programmable hardware element, such as a FPGA or an ASIC. In some examples, the processors 712 may include one or more ICs that are configured to perform the functions of processors 712. For example, each IC may include circuitry configured to perform the functions of processors 712.

The modem 720 may include hardware and software components for time division multiplexing UL data (e.g., for NSA NR operations), as well as the various other techniques described herein. The processors 722 may include one or more processing elements configured to implement various features described herein, such as by executing instructions stored on the memory 726 (e.g., a non-transitory computer-readable memory medium). In some examples, the processor 722 may be configured as a programmable hardware element, such as a FPGA or an ASIC. In some examples, the processor 722 may include one or more ICs that are configured to perform the functions of processors 722. For example, each IC may include circuitry configured to perform the functions of processors 522.

Figure 8:
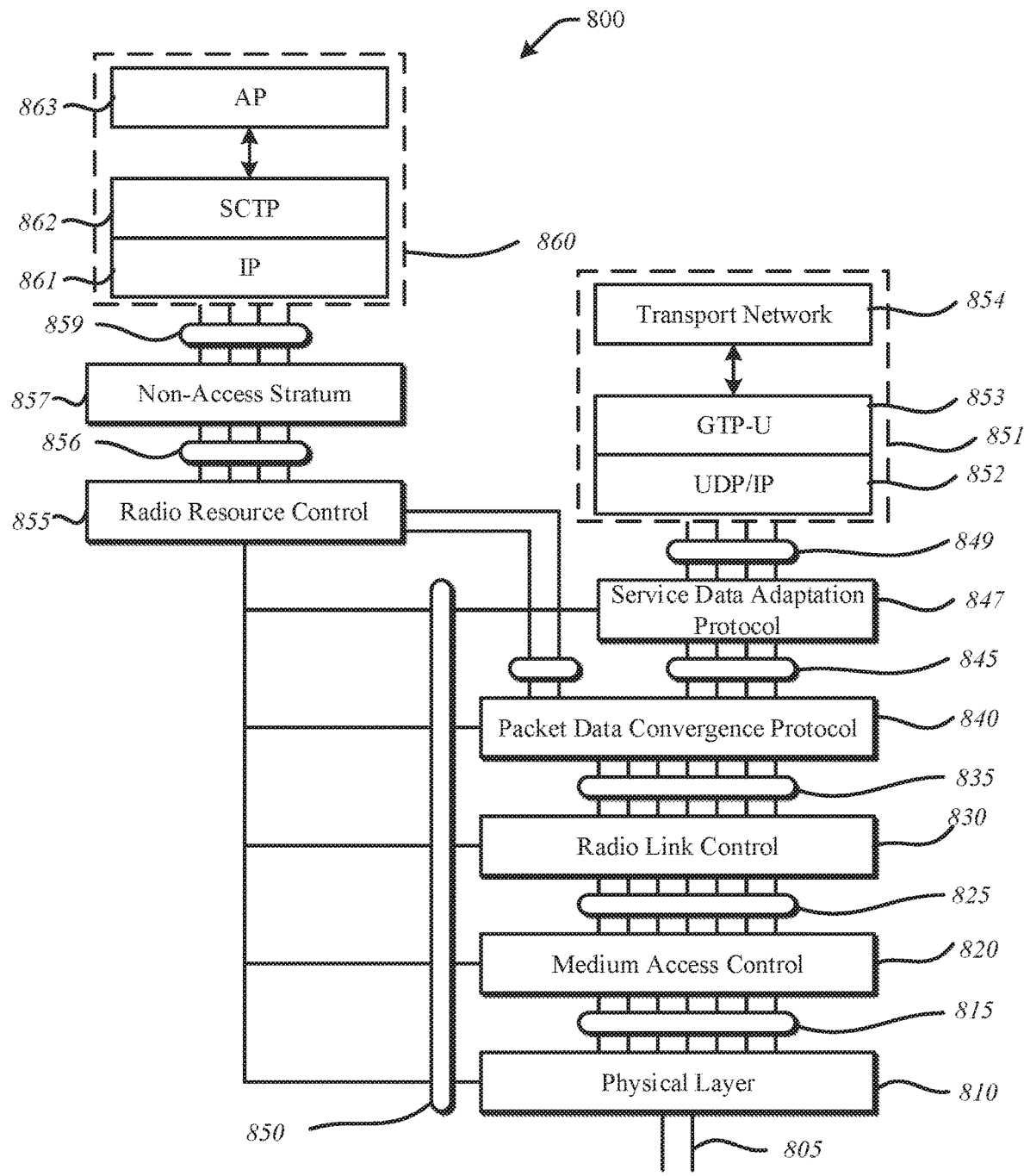
FIG. 8 illustrates example protocol functions that may be implemented in wireless communication systems.

FIG. 8 illustrates various protocol functions that may be implemented in a wireless communication device. In particular, FIG. 8 includes an arrangement 800 showing interconnections between various protocol layers/entities. The following description of FIG. 8 is provided for various protocol layers and entities that operate in conjunction with the 5G NR system standards and the LTE system standards, but some or all of the aspects of FIG. 8 may be applicable to other wireless communication network systems as well.

The protocol layers of arrangement 800 may include one or more of PHY 810, MAC 820, RLC 830, PDCP 840, SDAP 847, RRC 855, and NAS layer 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may include one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding and decoding of the transport channels, modulation and demodulation of physical channels, interleaving, rate matching, mapping onto physical channels, and MIMO antenna processing. In some examples, an instance of PHY 810 may process requests from and provide indications to an instance of MAC 820 using one or more PHY-SAP 815. In some examples, requests and indications communicated using PHY-SAP 815 may comprise one or more transport channels.

Instance(s) of MAC 820 may process requests from, and provide indications to, an instance of RLC 830 using one or more MAC-SAPs 825. These requests and indications communicated using the MAC-SAP 825 may include one or more logical channels. The MAC 820 may perform mapping between the logical channels and transport channels, multiplexing of MAC SDUs from one or more logical channels onto transport blocks (TBs) to be delivered to PHY 810 using the transport channels, de-multiplexing MAC SDUs to one or more logical channels from TBs delivered from the PHY 810 using transport channels, multiplexing MAC SDUs onto TBs, scheduling information reporting, error correction through HARQ, and logical channel prioritization.

Instance(s) of RLC 830 may process requests from and provide indications to an instance of PDCP 840 using one or more radio link control service access points (RLC-SAP)

835. These requests and indications communicated using RLC-SAP 835 may include one or more RLC channels. The RLC 830 may operate in a plurality of modes of operation, including: Transparent Mode™, Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 or instance(s) of SDAP 847, or both, using one or more packet data convergence protocol service access points (PDCP-SAP) 845. These requests and indications communicated using PDCP-SAP 845 may include one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 847 may process requests from and provide indications to one or more higher layer protocol entities using one or more SDAP-SAP 849. These requests and indications communicated using SDAP-SAP 849 may include one or more QoS flows. The SDAP 847 may map QoS flows to data radio bearers (DRBs), and vice versa, and may also mark QoS flow identifiers (QFIs) in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In some examples, the SDAP 847 may only be used in NR implementations and may not be used in LTE implementations.

The RRC 855 may configure, using one or more management service access points (M-SAP), aspects of one or more protocol layers, which may include one or more instances of PHY 810, MAC 820, RLC 830, PDCP 840 and SDAP 847. In some examples, an instance of RRC 855 may process requests from and provide indications to one or more NAS entities 857 using one or more RRC-SAPs 856. The main services and functions of the RRC 855 may include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

In some examples, one or more protocol entities of arrangement 800 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In some examples, one or more protocol entities that may be implemented in one or more of UE 101, gNB 111, AMF 321, among others, may communicate with a respective peer protocol entity that may be implemented in or on another device using the services of respective lower layer protocol entities to perform such communication. In some examples, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In some examples, a control plane protocol stack may include, in order from highest layer to lowest layer, NAS 857, RRC 855, PDCP 840, RLC 830, MAC 820, and PHY 810. In this example, upper layers 860 may be built on top of the NAS 857, which includes an IP layer 861, an SCTP 862, and an application layer signaling protocol (AP) 863.

In some examples, such as NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise elementary procedures (EPs). An NG-AP EP may be a unit of interaction between the NG-RAN node 111 and the AMF 321. The NG-AP 863 services may include two groups: UE-associated services (e.g., services related to a UE 101) and non-UE-associated services (e.g., services related to the whole NG interface instance between the NG-RAN node 111 and AMF 321). These services may include functions such as, but not limited to: a paging function for the sending of paging requests to NG-RAN nodes 111 involved in a particular paging area; a UE context management function for allowing the AMF 321 to establish, modify, or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may include S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 862 may ensure reliable delivery of signaling messages between the RAN node 111 and the AMF 321/MME 221 based in part on the IP protocol, supported by the IP 861. The Internet Protocol layer (IP) 861 may be used to perform packet addressing and routing functionality. In some implementations the IP layer 861 may use point-to-point transmission to deliver and convey PDUs.

In this regard, the RAN node 111 may include L2 and L1 layer communication links (e.g., wired or wireless) with the MME/AMF to exchange information.

In some examples, a user plane protocol stack may include, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW 222 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane PDU layer (UP PDU) 863.

The transport network layer 854 (also referred to as a "transport layer") may be built on IP transport, and the GTP-U 853 may be used on top of the UDP/IP layer 852 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW 222 and the P-GW 223 may utilize an S5/S8a interface to exchange user plane data using a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some examples, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 9:
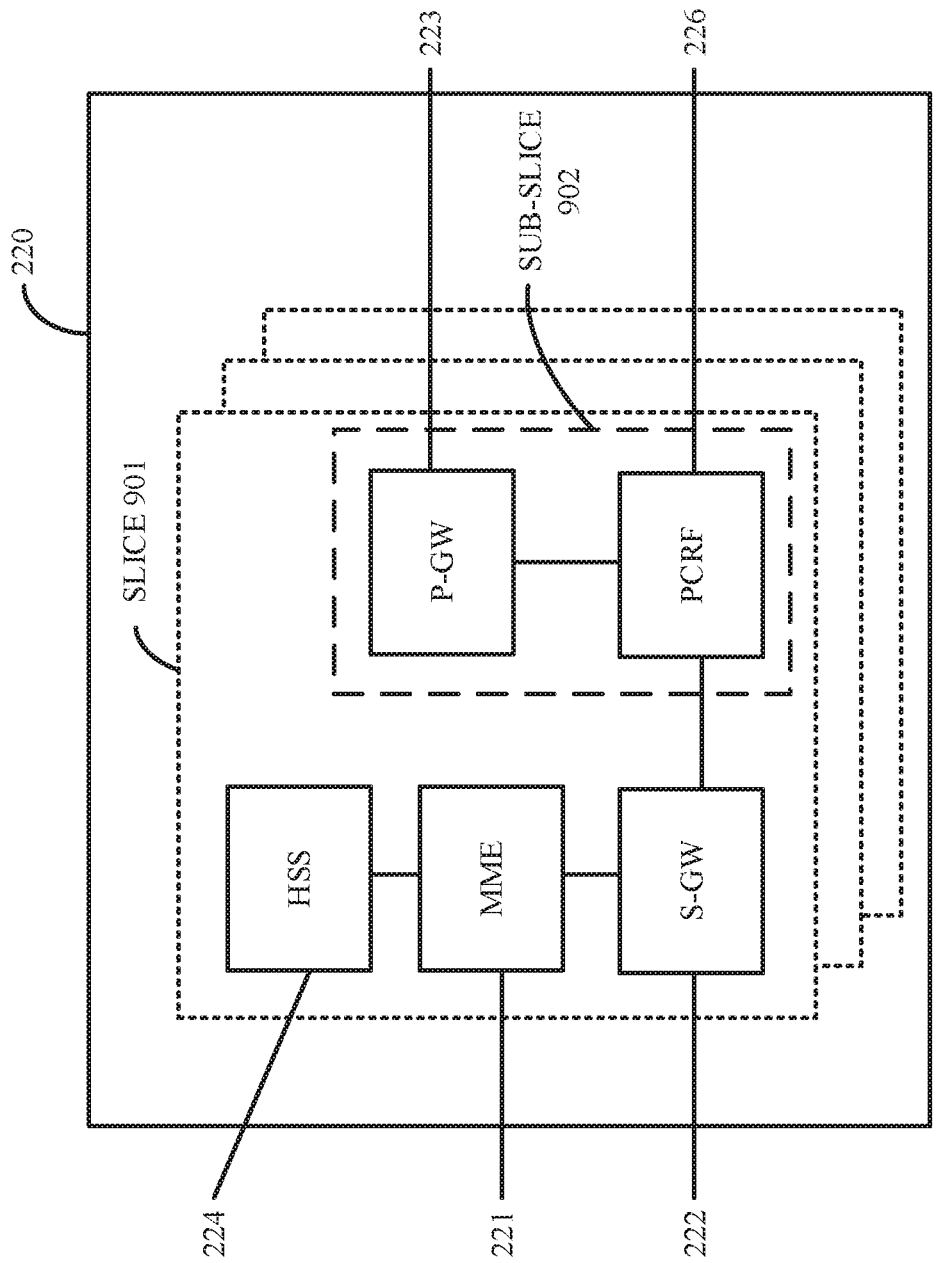
FIG. 9 illustrates example components of a core network.

FIG. 9 illustrates components of a core network 220. The components of the CN 220 may be implemented in one physical node or separate physical nodes and may include components to read and execute instructions from a machine-readable or computer-readable medium (e.g., a non-transitory machine-readable storage medium). In some examples, the components of CN 320 may be implemented in a same or similar manner as discussed herein with regard to the components of CN 220. In some examples, NFV is utilized to virtualize any or all of the above-described network node functions using executable instructions stored in one or more computer-readable storage mediums, as described in further detail below. A logical instantiation of the CN 220 may be referred to as a network slice 901, and individual logical instantiations of the CN 220 may provide specific network capabilities and network characteristics. A logical instantiation of a portion of the CN 220 may be referred to as a network sub-slice 902 (e.g., the network sub-slice 902 is shown to include the P-GW 223 and the PCRF 226).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice may include a RAN part and a CN part. The support of network slicing relies on the principle that traffic for different slices is handled by different PDU sessions. The network can realize the different network slices by scheduling or by providing different L1/L2 configurations, or both. The UE 301 provides assistance information for network slice selection in an appropriate RRC message if it has been provided by NAS. While the network can support large number of slices, the UE need not support more than 8 slices simultaneously in some examples.

A network slice may include the CN 320 control plane and user plane NFs, NG-RANs 310 in a serving PLMN, and a N3IWF functions in the serving PLMN. Individual network slices may have different S-NSSAI or different SSTs, or both. NSSAI includes one or more S-NSSAIs, and each network slice is uniquely identified by an S-NSSAI. Network slices may differ for supported features and network functions optimizations. In some examples, multiple network slice instances may deliver the same services or features but for different groups of UEs 301 (e.g., enterprise users). For example, individual network slices may deliver different committed service(s) or may be dedicated to a particular customer or enterprise, or both. In this example, each network slice may have different S-NSSAIs with the same SST but with different slice differentiators. Additionally, a single UE may be served with one or more network slice instances simultaneously using a 5G AN, and the UE may be associated with eight different S-NSSAIs. Moreover, an AMF 321 instance serving an individual UE 301 may belong to each of the network slice instances serving that UE.

Network slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that comprise each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some examples, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the NG-RAN 310 may be allowed to apply some provisional or local policies based on awareness of a particular slice that the UE 301 is requesting to access. During the initial context setup, the NG-RAN 310 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components and functions.

Figure 10:
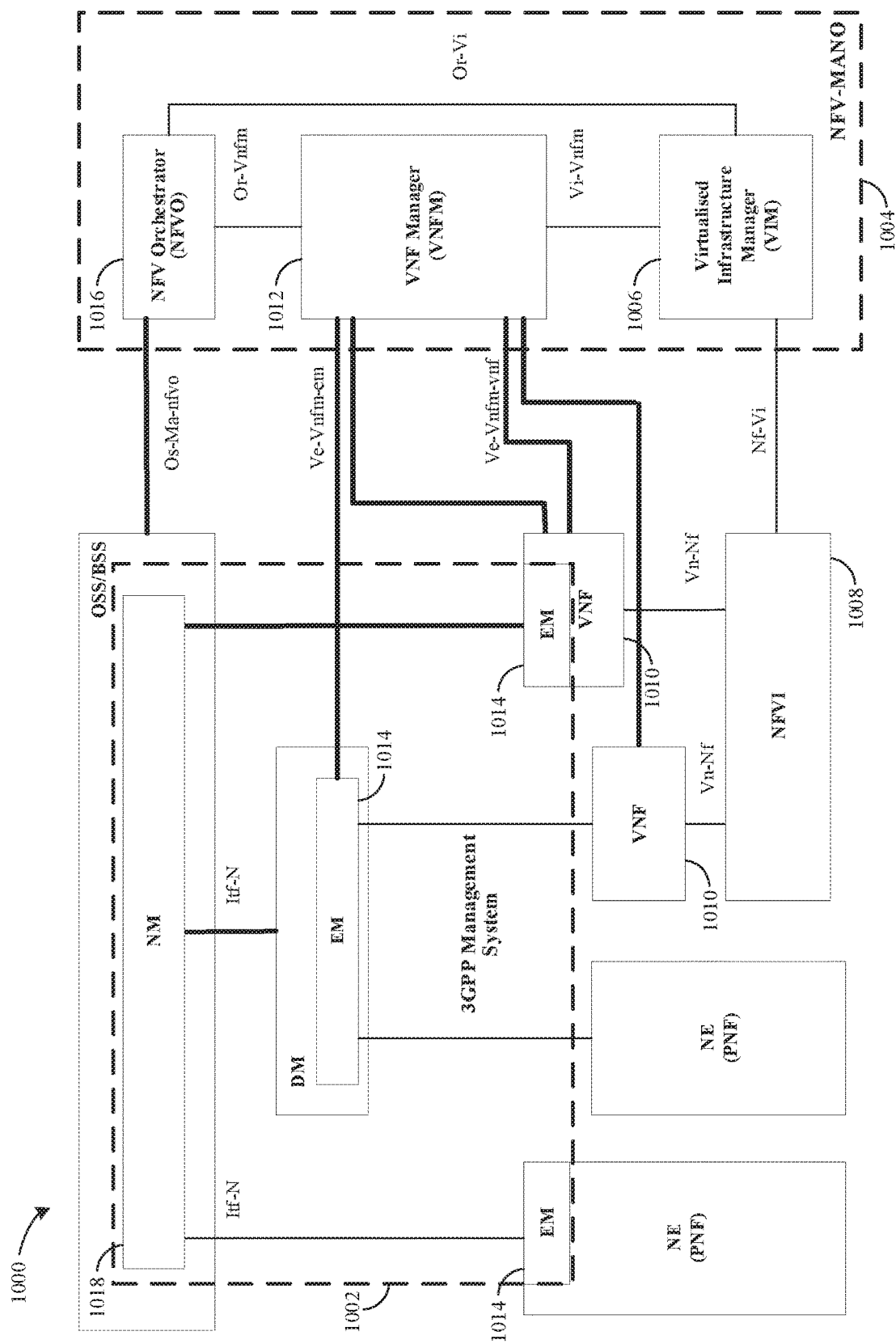
FIG. 10 illustrates an example system to support network function virtualization.

FIG. 10 depicts an example management system 1000 for mobile networks that include virtualized network functions. The management system 1000 can include a 3GPP management system 1002 and NFV-MANO framework 1004 (e.g., ETSI GS NFV-MAN 001). The 3GPP management system 1002 of FIG. 10 is based on 4G networks, but aspects of the management system may be applicable to 5G networks or other networks. The architecture 1000 is illustrated as including a virtualized infrastructure manager (VIM) 1006, a network function virtualization infrastructure (NFVI) 1008, virtualized network function(s) (VNFs) 1010, a VNF manager (VNFM) 1012, element managers (EMs) 1014, a network function virtualization orchestrator (NFVO) 1016, and a network manager (NM) 1018. The mobile network comprises physical and virtualized network elements. Application-specific aspects of both VNFs and PNFs, corresponding to physical network elements (NEs), are managed by the 3GPP management system 1002.

In the system 1000, the Itf-N is an interface between the NM 1018 and the DM/EM 1014, the Os-Ma-nfvo is the reference point between the operation support system (OSS)/business support system (BSS) (e.g., the NM 1014) and the NFVO 1016, the Ve-Vnfm-em is the reference point between the EM 1014 and the VNFM 1012, and the Ve-Vnfm-vnf is the reference point between the VNF 1010 and the VNFM 1012.

The NFVI 1008 comprises hardware and software components that together provide the infrastructure resources where VNFs are deployed. The infrastructure resources contain the hardware resources, virtualization layer software and the virtualized resources which the VNF relies on. NFVI resources under consideration are both virtualized and non-virtualized resources, supporting virtualized network functions and partially virtualized network functions. Virtualized resources include those that can be associated with virtualization containers, and have been cataloged and offered for consumption through appropriately abstracted services, for example, compute including machines (e.g., hosts or bare metal), and virtual machines, as resources that comprise both CPU and memory; storage, including: volumes of storage at either block or file-system level; and network, including: networks, subnets, ports, addresses, links and forwarding rules, for the purpose of ensuring intra- and inter-VNF connectivity.

The EMs 1014 track the performance, fault and security of the functional aspects of VNFs 1010. The tracking data from the VNFM 1012 and the EMs 1014 may comprise, for example, performance management (PM) data used by the VIM or the NFVI 1008. Both the VNFM 1012 and the EM 1014 can scale up/down the quantity of VNFs 1010 of the system 1000.

The NM 1018 supports the OSS/BSS and is the consumer of reference point Os-Ma-nfvo. The NM 1018 provides the functions for management of mobile networks, including the VNFs 1010. The NM 1018 may provide a package of end-user functions with the responsibility for the management of a network, which may include network elements with VNFs, non-virtualized network functions, or both (management of the VNFs may occur via an EM). The NM 1018 can support fault, configuration, accounting, performance, and security (FCAPS) management functions of the mobile network (e.g. IMS, EPC, NR, etc.) and 3GPP service (e.g. data service, voice service) and supports the management of mobile network lifecycle. NM 1018 initiates the lifecycle management of NS and VNF, which are related to mobile network, through interaction with NFV-MANO 1004.

The EM 1014 and/or DM is responsible for FCAPS management functionality for a VNF 1010 on an application level and physical NE on a domain and element level. This includes: fault management for VNF and physical NE; configuration management for VNF and physical NE; accounting management for VNF and physical NE; performance measurement and collection for VNF and physical NE; and security management for VNF and physical NE. EM/DM participates in lifecycle management functionality for a VNF, such as by requesting a lifecycle management operation for a VNF to VNFM, and exchanging information regarding the VNF and Virtualized Resources associated with the VNF. The DM/EM (including EM extended functionality) can manage both PNF(s) and VNF(s).

The NFV-MANO 1004 comprises the NFVO 1016, VNFM 1012, and VIM 1006. The NFVO 1016 and VNFM 1012 share interfaces with the NM 1018, DM/EM 1014 and VNF 1010. The NFVO 1016 is responsible for the orchestration of NFVI resources across multiple VIMs 1006, fulfilling the Resource Orchestration functions, and the lifecycle management of Network Services, fulfilling the Network Service Orchestration functions. The NFVO 1016 may coordinate, authorize, release and engage resources of the NFVI in order to provide the requested service (e.g., to execute a network function, component, or slice).

The VIM 1006 manages the resources of the NFVI 1008. The NFVI 1008 can include physical or virtual resources and applications (including hypervisors) used to execute the system 1000. The VIM 1006 may manage the life cycle of virtual resources with the NFVI 1008 (e.g., creation, maintenance, and tear down of VMs associated with one or more physical resources), track VM instances, track performance, fault and security of VM instances and associated physical resources, and expose VM instances and associated physical resources to other management systems.

The VNFM 1012 manages the VNFs 1010. The VNFs 1010 may be used to execute network (e.g., EPC, NR, etc.) components/functions. The VNFM 1012 may manage the life cycle of the VNFs 1010 and track performance, fault and security of the virtual aspects of VNFs 1010.

The management and orchestration of virtualized resources includes handing NFVI resources (e.g. in NFVI Nodes), in NFVI Points of Presence (NFVI-PoPs). Management of non-virtualized resources is restricted to provisioning connectivity to PNFs, necessary when a NS instance includes a PNF that needs to connect to a VNF, or when the NS instance is distributed across multiple NFVI-PoPs or N-PoPs.

The virtualized resources are leveraged for providing the VNFs 1010 with the resources they need. Resource allocation in the NFVI 1008 is a potentially complex task because a lot of requirements and constraints may need to be met at the same time. In particular, requirements for network allocation add new complexity compared to known resource allocation strategies for computing resources in virtualized environments. For example, some VNFs 1010 require low latency or high bandwidth links to other communication endpoints.

Allocation and release of resources is a dynamic process, in response to consumption of those services by other functions. While the management and orchestrations function for virtualized infrastructure are VNF-unaware, resource allocations and releases may be needed throughout the VNF lifetime. An advantage of NFV is that with increasing load VNFs can dynamically consume services that allocate additional resource when scaling-out is triggered.

Services exposing virtualized resources include, but are not limited to: discovery of available services; management of virtualized resources availability/allocation/release; and virtualized resource fault/performance management.

In the case of virtualized resources distributed across multiple NFVI-PoPs, those services could either be exposed directly by the management and orchestration functions for each individual NFVI-PoP, or via a higher-level service abstraction presenting the virtualized resources across multiple NFVI-PoPs. Both types of services could be exposed to the consuming functions. In the case of the higher level service abstraction previously mentioned, the management and orchestration of virtualized resources and non-virtualised networking resources across those NFVI-PoPs falls under the responsibility of the management and orchestration of the virtualized infrastructure that may in turn use the services exposed directly by the management and orchestration functions of a single or across multiple NFVI-PoPs. In order to provide those services, the management and orchestration of the virtualized infrastructure consumes services provided by the NFVI.

The NFV management and orchestration functions that coordinate virtualized resources in a single NFVI-PoP and/or across multiple NFVI-PoPs should ensure exposure of services that support accessing these resources in an open, abstracted manner. These services can be consumed by other authenticated and properly authorized NFV management and orchestration functions (e.g. functions that manage and orchestrate virtualized network functions).

Network Service Lifecycle management includes, among other things, on-boarding Network Service (e.g., registering a Network Service in the catalogue and ensure that all the templates describing the NS are on-boarded); instantiating a Network Service (e.g., creating a Network Service using the NS on-boarding artefacts); scaling a Network Service (e.g., increasing or reducing the capacity of the Network Service); updating a Network Service by supporting Network Service configuration changes of various complexity such as changing inter-VNF connectivity or the constituent VNF instances; performing create, delete, query, and update procedures for VNF forwarding graphs (VNFFGs) associated to a Network Service; and terminating Network Services (e.g., requesting the termination of constituent VNF instances, requesting the release of NFVI resources associated to NSs, and return them to NFVI resource pool, if applicable.

The deployment and operational behavior requirements of each Network Service can be captured in a deployment template, and stored during the Network Service on-boarding process in a catalogue, for future selection for instantiation. The deployment template describes the attributes and requirements used to realize such a Network Service. Network Service Orchestration coordinates the lifecycle of VNFs that jointly realize a Network Service. In some examples, this includes managing the associations between different VNFs, and when applicable between VNFs and PNFs, the topology of the Network Service, and the VNFFGs associated with the Network Service.

During the Network Service lifecycle, the Network Service Orchestration functions may monitor key performance indicators (KPIs) of a Network Service if such requirements were captured in the deployment template, and may report this information to support explicit request for such operations from other functions.

The Network Service Orchestration performs its services by using the VNF management functions and by orchestrating the NFV Infrastructure that supports the interconnection between VNFs functionality, and its functions are exposed in an open, abstracted manner as services to other functions. In order to fulfil its responsibilities, the Network Service Orchestration functions consume services exposed by other functions (e.g., Virtualized Infrastructure management functions).

In some examples, the services provided by Network Service Orchestration can be consumed by other functions that are authenticated and authorized (e.g. OSS, BSS).

The VNFM 1012 is responsible for the lifecycle management of VNF instances. Each VNF instance is assumed to have an associated VNF Manager. The VNF manager may be assigned the management of a single VNF instance, or the management of multiple VNF instances of the same type or of different types.

In some examples, the VNFM functions are assumed to be generic functions applicable to multiple VNFs. The NFV-MANO architectural framework may also support cases where VNF instances need specific functionality for their lifecycle management, and such functionality may be specified in the VNF Package.

The VNF 1010 is configured to perform VNF instantiation, including VNF configuration if required by the VNF deployment template (e.g., VNF initial configuration with IP addresses before completion of the VNF instantiation operation); VNF instantiation feasibility checking; VNF instance software update/upgrade; VNF instance modification; VNF instance scaling out/in and up/down; VNF instance-related collection of NFVI performance measurement results and faults/events information, and correlation to VNF instance-related events/faults; VNF instance assisted or automated healing; VNF instance termination; VNF lifecycle management change notification; management of the integrity of the VNF instance through its lifecycle; and overall coordination and adaptation role for configuration and event reporting between the VIM and the EM. The aforementioned functionalities may be exposed by means of interfaces and consumed by other NFV-MANO functional blocks or by authorized external entities.

The deployment and operational behavior of each VNF 1010 can be captured in a template (e.g., a Virtualized Network Function Descriptor (VNFD)) that is stored in the VNF catalogue. NFV-MANO uses a VNFD to create instances of the VNF it represents, and to manage the lifecycle of those instances. A VNFD has a one-to-one correspondence with a VNF Package, and describes the attributes and requirements to realize such a VNF. NFVI resources are assigned to a VNF based on the requirements captured in the VNFD (containing resource allocation criteria, among others), but also taking into consideration specific requirements, constraints, and policies that have been pre-provisioned or are accompanying the request for instantiation and may override certain requirements in the VNFD (e.g., operator policies, geo-location placement, affinity/anti-affinity rules, local regulations).

The information elements to be handled by the NFV-MANO 1004, including the VNFD among others, may guarantee the flexible deployment and portability of VNF instances on multi-vendor and diverse NFVI environments (e.g., with diverse computing resource generations, diverse virtual network technologies, etc.). To do so, hardware resources are abstracted and the VNF requirements are described in terms of such abstraction.

The VNFM 1012 has access to a repository of available VNF Packages and different versions of them, all represented via their associated VNFDs. Different versions of a VNF Package may correspond to different implementations of the same function, different versions to run in different execution environments (e.g., on different hypervisors, dependent on NFVI resources availability information, etc.), or different release versions of the same software. The repository may be maintained by the NFVO or another external entity.

The VIM 1006 is responsible for controlling and managing the NFVI compute, storage and network resources, usually within an operator's Infrastructure Domain (e.g., all resources within an NFVI-PoP, resources across multiple NFVI-POPs, or a subset of resources within an NFVI-PoP) as discussed previously. A VIM 1006 may be specialized in handling a certain type of NFVI resource (e.g., compute-only, storage-only, networking-only, etc.), or may be capable of managing multiple types of NFVI resources (e.g. in NFVI-Nodes). A particular example of a specialized VIM is a WAN Infrastructure Manager (WIM), which is used to establish connectivity between PNF endpoints in different NFVI-PoPs.

In some examples, the VIM 1006 is configured to: orchestrate the allocation/upgrade/release/reclamation of NFVI resources (which may include the optimization of such resources usage), and manage the association of the virtualized resources to the physical compute, storage, networking resources, wherein the VIM keeps an inventory of the allocation of virtual resources to physical resources (e.g., to a server pool and/or the like). The VIM also supports the management of VNF Forwarding Graphs (create, query, update, delete), for example, by creating and maintaining Virtual Links, virtual networks, sub-nets, and ports, as well as the management of security group policies to ensure network/traffic access control.

The VIM 1006 can also manage, in a repository, inventory related information of NFVI hardware resources (compute, storage, networking) and software resources (e.g., hypervisors), and discovery of the capabilities and features (e.g., related to usage optimization) of such resources; manage the virtualized resource capacity (e.g., density of virtualized resources to physical resources), and forwarding of information related to NFVI resources capacity and usage reporting; manage software images (add, delete, update, query, copy) as requested by other NFV-MANO functional blocks (e.g., NFVO). The VIM can maintain repositories for software images, in order to streamline the allocation of virtualized computing resources, and a validation step, performed by VIM, is required for software images before storing the image (e.g., VNF package on-boarding and update).

The VIM 1006 can collect performance and fault information (e.g., via notifications) of hardware resources (compute, storage, and networking) software resources (e.g., hypervisors), and virtualized resources (e.g., VMs); and forwarding of performance measurement results and faults/events information relative to virtualized resources; and In some examples, the VIM 1006 manages catalogues of virtualized resources that can be consumed from or by the NFVI 1008. The elements in the catalogue may be in the form of virtualized resource configurations (virtual CPU configurations, types of network connectivity (e.g., L2, L3), etc.), and/or templates (e.g., a virtual machine with two virtual CPUs and two GB of virtual memory).

Figure 11:
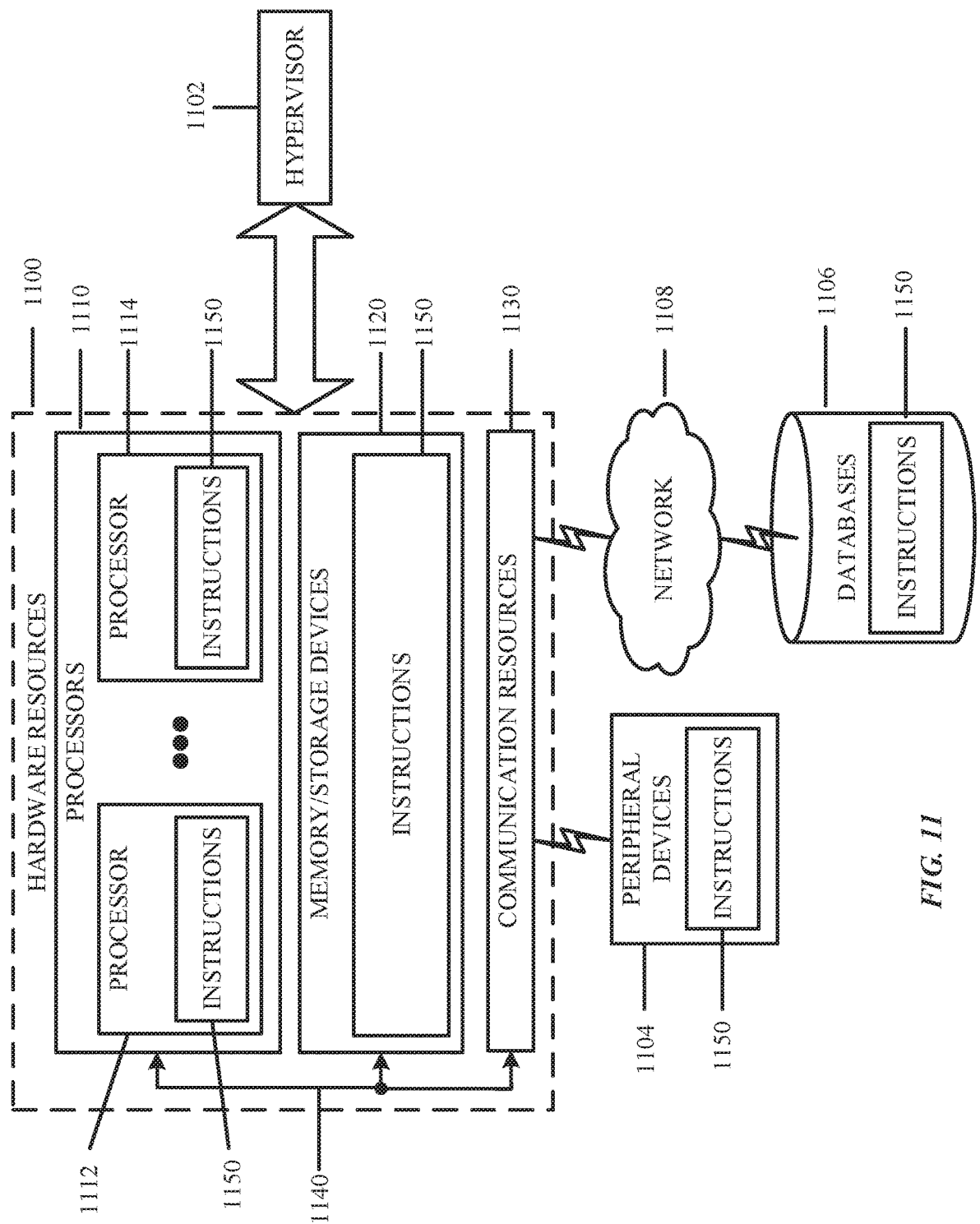
FIG. 11 illustrates an example computer system.

FIG. 11 is a block diagram illustrating components for reading instructions from a machine-readable or computer-readable medium (e.g., a non-transitory machine-readable storage medium) and performing any one or more of the techniques described herein. Specifically, FIG. 11 shows a diagrammatic representation of hardware resources 1100 including one or more processors (or processor cores) 1110, one or more memory or storage devices 1120, and one or more communication resources 1130, each of which may be communicatively coupled using a bus 1140. For implementations where node virtualization (e.g., NFV) is utilized, a hypervisor 1102 may be executed to provide an execution environment for one or more network slices or sub-slices to utilize the hardware resources 1100.

The processors 1110 may include a processor 1112 and a processor 1114. The processor(s) 1110 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1120 may include main memory, disk storage, or any suitable combination thereof. The memory/storage devices 1120 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 1130 may include interconnection or network interface components or other suitable devices to communicate with one or more peripheral devices 1104 or one or more databases 1106 using a network 1108. For example, the communication resources 1130 may include wired communication components (e.g., for coupling using USB), cellular communication components, NFC components, Bluetooth® (or Bluetooth® Low Energy) components, Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

When an AF (e.g., AF 328) needs to trigger a UE (e.g., UE 101, 201, 301) to perform some action, the AF requests the NEF (e.g., NEF 323) to send an application trigger to the UE. To do so, the AF can invoke the Nnef_Trigger service to request that the network send an application trigger to the UE.

Figure 12:
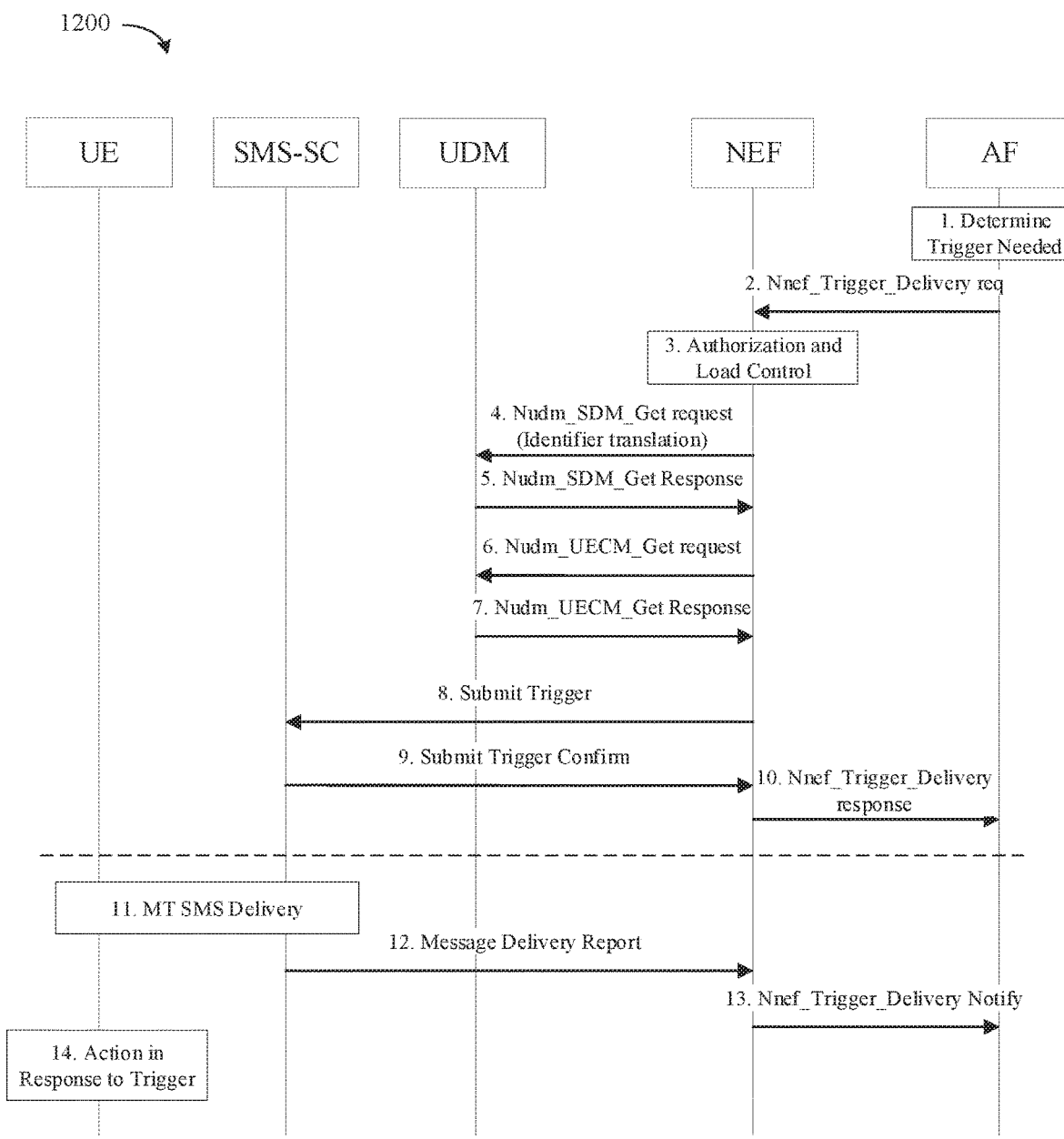
FIG. 12 illustrates an example device triggering procedure.

FIG. 12 shows an example device triggering procedure 1200 according to some embodiments. The device triggering procedure 1200 may operate as follows:

1. The AF determines the need to trigger the device (e.g., the UE). If the AF has no contact details for the NEF, it can discover and select the NEF services, as described in 3GPP TS 23.502.

2. The AF communicates with the NEF to invoke the Nnef_Trigger_Delivery service operation to request that an application trigger be sent to a UE, and to subscribe to notifications about the result of the application trigger delivery attempt. Additional details on the Nnef_Trigger_Delivery service operation are described in clause 5.2.6.5.2 of 3GPP TS 23.502.

3. The NEF checks that the AF is authorized to send trigger requests and that the AF has not exceeded its quota or rate of trigger submission over Nnef. If this check fails, the NEF sends a Nnef_Trigger_Delivery response to the AF with a cause value indicating the reason for the failure condition and the flow stops at this step. Otherwise, the flow continues with step 4 of the procedure 1200.

4. When the AF is authorized to trigger the UE, the NEF invokes the Nudm_SDM_Get service operation (e.g., with Identifier Translation, GPSI and AF Identifier as parameters) to resolve the Generic Public Subscription Identifier (GPSI) to a Subscription Permanent Identifier (SUPI). In some examples, mapping from GPSI (External Id) to GPSI (mobile subscription ISDN number (MSISDN)) is provided to support infrastructure without MSISDN-less SMS capabilities. Additional details on the Nudm_SDM_Get service operation are described in clause 5.2.3.3.1 of 3GPP TS 23.502.

5. The UDM may invoke the Nudr_DM_Query service operation to retrieve a list of AFs that are allowed to trigger the UE and determines, based on UDM policy, which identifier (e.g., SUPI or MSISDN) should be used to trigger the UE. Additional details on the Nudr_DM_Query service operation are described in clause 5.2.12.2.2 of 3GPP TS 23.502. If the AF is authorized to trigger the UE, the UDM provides a Nudm_SDM_Get response with the appropriate identifier (e.g., with the SUPI or MSISDN, or both). If the AF is not allowed to send a trigger message to the UE, or there is no valid subscription information for the UE, the NEF sends a Nnef_Trigger_Delivery response with a cause value indicating the reason for the failure condition and the flow stops at this step. Otherwise, the flow continues with step 6. In some examples, the presence of an MSISDN in the reply is interpreted as an indication to the NEF that MSISDN is used (instead of IMSI) to identify the UE when sending the SMS to the SMS Service Center (SMS-SC) via T4.

6. The NEF invokes the Nudm_UECM_Get service operation (e.g., with SUPI, SMS) to retrieve the UE SMSF identities. Additional details on the Nudm_UECM_Get service operation are described in clause 5.2.3.2.4 of 3GPP TS 23.502.

7. The UDM may invoke the Nudr_DM_Query service to retrieve the UE SMSF identities. The UDM provides a Nudm_UECM_Get response with the corresponding UE SMSF identities. UDM policy (which may be dependent on the Visited Public Land Mobile Network (VPLMN) ID) may influence which serving node identities are returned. In some examples, the NEF can cache serving node information for the UE. However, this can increase the probability of trigger delivery attempt failures when the cached serving node information is stale.

8. The NEF selects a suitable SMS-SC based on configured information. In some examples, the NEF acts as a Machine Type Communications Interworking Function (MTC-IWF) and sends a Submit Trigger (e.g., with the GPSI, SUPI, AF Identifier, trigger reference number, validity period, priority, SMSF serving node ID(s) (if available, are obtained from UDM in step 7), SMS Application port ID, trigger payload, Trigger Indication) message to the SMS-SC. If the NEF indicates that "Absent subscriber" was received from the UDM, the SMS-SC should not submit the message, but store it directly and send Routing Information for SM to request the UDM to add the SMS-SC address to the Message Waiting List.

9. The SMS-SC sends a Submit Trigger Confirm message to the NEF to confirm that the submission of the SMS has been accepted by the SMS-SC.

10. The NEF sends a Nnef_Trigger_Delivery response to the AF to indicate if the Device Trigger Request has been accepted for delivery to the UE.

11. The SMS-SC performs Mobile Terminated (MT) SMS delivery (e.g., as defined in clause 4.13.3 of 3GPP TS 23.502). The SMS-SC may provide the routing information that it received in step 6 to the SMS Gateway Mobile Services Switching Center (GMSC) to avoid UDM interrogation. The SMS-SC generates the necessary Call Detail Record (CDR) information and includes the AF Identifier. The SMS Application port ID, which is included in the SM User Data Header, and the Trigger Indication are included in the CDRs in order to enable differentiated charging. The SMS-SC stores the trigger payload, without routing information. If the message delivery fails and is attempted to be delivered again, UDM interrogation will be performed. If the message delivery fails and the validity period of this trigger message is not set to zero, the SMS-SC shall send a SM Message Delivery Status Report to request the UDM to add the SMS-SC address to the Message Waiting list. When the message delivery is later re-attempted, a new UDM interrogation will be performed by the SMS-GMSC using SUPI or MSISDN. UDM interrogations using SUPI may not be forwarded or relayed to SMS-Router or IP-SM-GWs. The UDM may include up to four serving node identities (MSC or MME, SGSN, IP-SM-GW, AMF) in the response to SMS-GMSC.

12. If the message delivery fails (either directly or when validity period of the trigger message expires) or when the message delivery succeeds, the SMS-SC may send a Message Delivery Report (e.g., with the cause code, trigger reference number, AF Identifier) to the NEF.

13. The NEF provides a Nnef_Trigger_Delivery Notify message to the AF with a Delivery Report indicating the trigger delivery outcome (e.g. succeeded, unknown or failed and the reason for the failure). Additional details on the Nnef_Trigger_Delivery Notify operation are described in clause 5.2.6.5.3 of 3GPP TS 23.502. The NEF generates the CDR information including the GPSI and AF Identifier.

14. In response to the received device trigger, the UE takes specific actions and may take into consideration the content of the trigger payload. This action typically involves initiation of immediate or later communication with the AF.

The application in the UE may perform actions as indicated by the trigger payload when the trigger payload is received at the UE. For example, the UE may initiate immediate or later communication with the application server based on the information contained in the trigger payload, which may include the PDU Session Establishment procedure if the related PDU Session is not already established. Thus, in order to ensure that the application runs normally, the network needs to successfully deliver the application trigger to the UE.

The SMS can be transferred over the non-access stratum (NAS) in 5G networks. To enable SMS over NAS transporting, the UE includes a "SMS supported" indication in its registration request indicating the UE's capability for SMS over NAS transport. In response, the network indicates to the UE whether the network allows the SMS message delivery over NAS in the registration accept message. If the SMS over NAS is allowed by the network, then the SMS messages can originate at the UE (e.g., for mobile originated (MO) messages) or be terminated by the UE (e.g., for mobile terminated (MT) messages), via 3GPP or non-3GPP access (see e.g., clause 4.13.3 of 3GPP TS 23.502). The performance of SMS over NAS, as a service provided to the end users, should be monitored.

Figure 13:
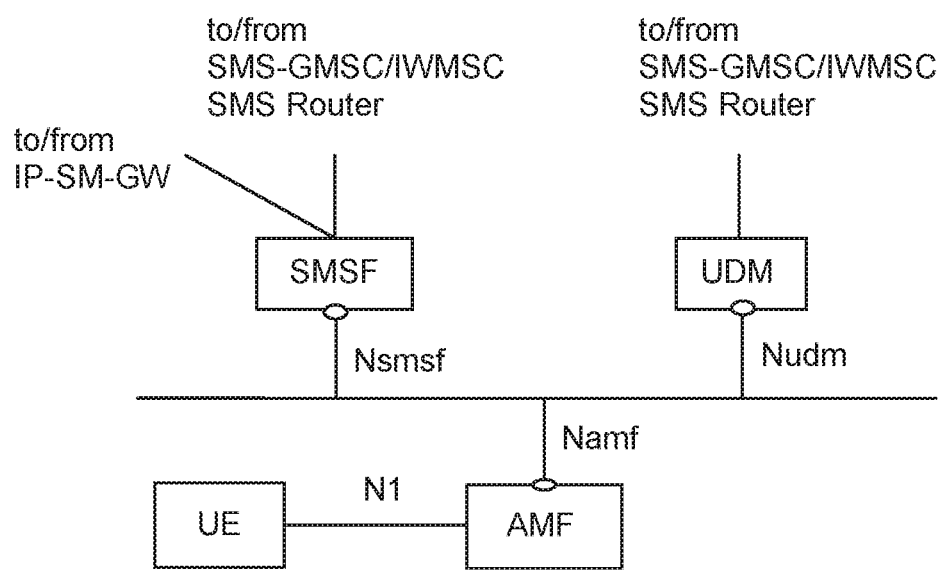
FIG. 13 illustrates an example non-roaming architecture.

FIG. 13 shows an example non-roaming architecture 1300 to support SMS over NAS using the service-based interfaces within the control plane. In the non-roaming architecture 1300, the SMS Function (SMSF) may be connected to the SMS-GMSC/IWMSC/SMS Router using, for example, one of the standardized interfaces as shown in 3GPP TS 23.203. In some examples, SMSF re-allocation while the UE is in RM REGISTERED state is not supported. Thus, when the serving AMF is re-allocated for a given UE, the source AMF includes the SMSF identifier as part of UE context transfer to the target AMF. The UDM may be connected to the SMS-GMSC/IWMSC/SMS Router using, for example, one of the standardized interfaces as shown in 3GPP TS 23.203. In some examples, each UE is associated with only one SMSF in the registered PLMN. To support MT SMS domain selection by the IP-SM-GW/SMS Router, the IP-SM-GW/SMS Router may connect to SGs MSC, MME or SMSF, or combinations of them, using, for example, one of the standardized interfaces as shown in 3GPP TS 23.203.

The present disclosure provides techniques for generating performance measurements related to application triggering for NEF and performance measurements related to SMS over NAS for AMF. The performance measurements related to application triggering for NEF provides the information for monitoring the performance of the triggering, and performance measurements related to SMS over NAS for AMF indicate the performance on providing the SMS over NAS to the end users.

Figure 14:
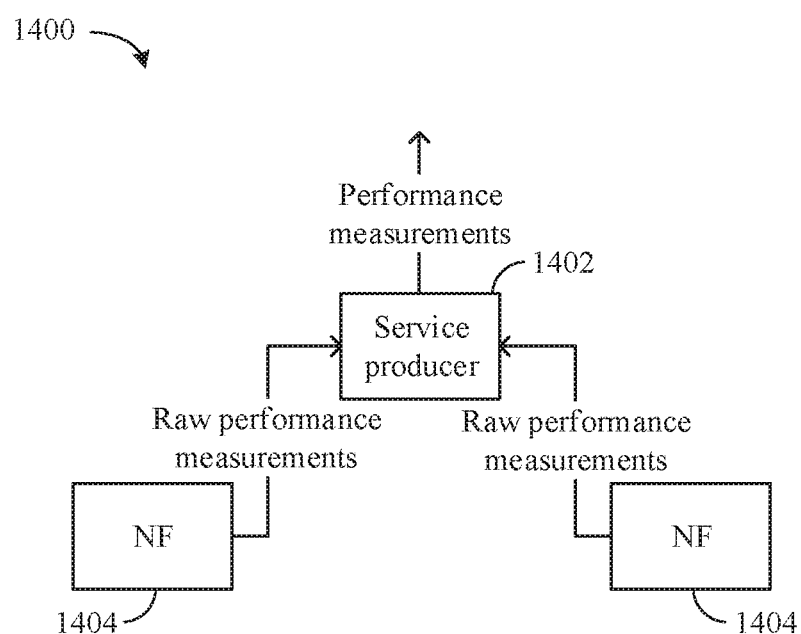
FIG. 14 illustrates an example performance management system.

FIG. 14 illustrates an example performance measurement system 1400. In the system 1400, a service producer 1402 (which may include software and/or hardware components) collects raw performance measurements from one or more NFs 1404. The service provider 1402 (or another entity) then uses the raw performance measurements to generate or derive performance data (sometimes referred to here as "performance indicators") for the one or more NFs 1404. The performance data can then be provided to, for example, service consumers.

In some examples, one or more of the NFs 1404 may be part of a group or set of NFs. The performance measurements for the group or set of NFs may be aggregated (e.g., according to an aggregation method identified in a performance indicator definition) and used to derive performance indicators for the group or set of NFs.

In general, performance indicators are derived from the performance measurements aggregated over one or more NFs, such as, for example, average latency along the network slice instance (NSI). The performance indicators can be derived from the performance measurements collected at the NF or the NFs that belong to the group. In some examples, the aggregation method is identified in the performance indicator definition. Performance indicators at the network slice subset instance (NSSI) level can be derived from the performance measurements collected at the NF(s) that belong to the NSSI or to constituent NSSIs. The performance indicators at the NSSI level can be made available using, for example, the corresponding performance management service for NSSI. In some examples, the performance indicators at the NSI level can be derived from the NSSI level performance indicators collected at the constituent NSSIs and/or NFs. The NSI level performance indicators can be made available using, for example, the corresponding performance management service for NSI.

In some examples, the performance measurements related to application triggering for NEF include a measurement of application trigger requests. This measurement can provide the number of application trigger requests received by the NEF from the AF. In some examples, this measurement is collected by a cumulative counter (e.g., an integer value) that is updated in response to receipt of a Nnef_Trigger_Delivery request by the NEF from the AF (see, e.g., 3GPP TS 23.502). In some examples, the measurement type (e.g., as defined in 3GPP TS 32.404, incorporated herein by reference in its entirety) for this measurement is AT.AppTriggerReq. In some examples, the measurement object class (e.g., as defined in 3GPP TS 32.404) is NEFFuntion. This measurement can be valid for packet switched traffic, and can be a pure 5G system (5GS) measurement (e.g., only 5GS events are counted).

In some examples, the performance measurements related to application triggering for NEF include a measurement of application trigger requests accepted for delivery. This measurement can provide the number of application trigger requests accepted for delivery to the UE. In some examples, this measurement is collected by a cumulative counter (e.g., an integer value) that is updated in response to transmission of a Nnef_Trigger_Delivery response by the NEF to the AF indicating that the application trigger request has been accepted for delivery to the UE (see, e.g., 3GPP TS 23.502). In some examples, the measurement type (e.g., as defined in 3GPP TS 32.404) for this measurement is AT.AppTriggerAcc. In some examples, the measurement object class (e.g., as defined in 3GPP TS 32.404) is NEFFuntion. This measurement can be valid for packet switched traffic, and can be a pure 5GS measurement.

In some examples, the performance measurements related to application triggering for NEF include a measurement of application trigger requests rejected for delivery. This measurement can provide the number of application trigger requests rejected for delivery to the UE. In some examples, this measurement is collected by a cumulative counter (e.g., an integer value) that is updated in response to transmission of a Nnef_Trigger_Delivery response by the NEF to the AF indicating that the application trigger request has been rejected for delivery to the UE (see, e.g., 3GPP TS 23.502). In some examples, this measurement is split into sub-counters (each of which may be an integer value) per error code (e.g., response code), and each Nnef_Trigger_Delivery response increments the relevant sub-counter based on the error code. In some examples, the measurement type (e.g., as defined in 3GPP TS 32.404) for this measurement is AT.AppTriggerRej.ErrorCode. In some examples, the measurement object class (e.g., as defined in 3GPP TS 32.404) is NEFFuntion. This measurement can be valid for packet switched traffic, and can be a pure 5GS measurement.

In some examples, the performance measurements related to application triggering for NEF include a measurement of application trigger delivery reports. This measurement can provide the number of application trigger delivery reports indicating the delivery results (e.g., success or failure) sent by the NEF to the AF. In some examples, this measurement is collected by a cumulative counter (e.g., an integer value) that is updated in response to transmission of a Nnef_Trigger_Delivery Notify message by the NEF to the AF indicating the delivery result of the application trigger (see, e.g., 3GPP TS 23.502). In some examples, this measurement is split into sub-counters (each of which may be an integer value) per delivery result, and each Nnef_Trigger_Delivery Notify message increments the relevant sub-counter based on the delivery result. In some examples, the measurement type (e.g., as defined in 3GPP TS 32.404) for this measurement is AT.AppTriggerRej.DeliveryResult. In some examples, the measurement object class (e.g., as defined in 3GPP TS 32.404) is NEFFunction. This measurement can be valid for packet switched traffic, and can be a pure 5GS measurement.

The performance measurements can also include measurements related to SMS over NAS. In some examples, these measurements distinguish between instances of 3GPP access (e.g., access in accordance with the 3GPP standards) and non-3GPP access. In other examples, these measurements are made without distinguishing between 3GPP and non-3GPP access.

In some examples, the performance measurements related to SMS over NAS include a measurement of registration of SMS over NAS. This measurement can provide the number of requests for registration of SMS over NAS received by the AF from the UEs. In some examples, this measurement is collected by a cumulative counter (e.g., an integer value) that is updated in response to a registration request message containing the "SMS supported" indication indicating that the UE supports SMS delivery over NAS by the AMF from the UE (see, e.g., 3GPP TS 23.502). In some examples, this measurement is split into sub-counters (each of which may be an integer value) based on the type of access (e.g., 3GPP or non-3GPP access), and each registration request message increments the relevant sub-counter based on the access type. In other examples, no distinction is made between the types of access (e.g., all registration request messages increment a single counter). In some examples, the measurement type (e.g., as defined in 3GPP TS 32.404) for this measurement is AT.SmsOverNasRegReq (or AT.SmsOverNasReg3GPPReq and AT.SmsOverNasRegNon3GPPReq if access distinctions are made). In some examples, the measurement object class (e.g., as defined in 3GPP TS 32.404) is AMFFunction. This measurement can be valid for packet switched traffic, and can be a pure 5GS measurement.

In some examples, the performance measurements related to SMS over NAS include a measurement of successful registrations of SMS over NAS. This measurement can provide the number of successful registrations allowed for SMS over NAS sent by the AF to the UEs. In some examples, this measurement is collected by a cumulative counter (e.g., an integer value) that is updated in response to transmission of a registration accept message containing the "SMS allowed" indication by the AMF to the UE (see, e.g., 3GPP TS 23.502). In some examples, this measurement is split into sub-counters (each of which may be an integer value) based on the type of access (e.g., 3GPP or non-3GPP access), and each registration accept message increments the relevant sub-counter based on the access type. In other examples, no distinction is made between the types of access (e.g., all registration accept messages increment a single counter). In some examples, the measurement type (e.g., as defined in 3GPP TS 32.404) for this measurement is AT.SmsOverNasRegSucc (or AT.SmsOverNasReg3GPPSucc and AT.SmsOverNasRegNon3GPPSucc if access distinctions are made). In some examples, the measurement object class (e.g., as defined in 3GPP TS 32.404) is AMFFunction. This measurement can be valid for packet switched traffic, and can be a pure 5GS measurement.

In some examples, the performance measurements related to SMS over NAS include a measurement of attempted mobile originated (MO) SMS messages over NAS. This measurement can provide the number of NAS messages encapsulating SMS messages received by the AF from the UE(s). In some examples, this measurement is collected by a cumulative counter (e.g., an integer value) that is updated in response to receipt of a NAS message with an indication of SMS transportation by the AMF from the UE (see, e.g., 3GPP TS 23.502). In some examples, this measurement is split into sub-counters (each of which may be an integer value) based on the type of access used for the message (e.g., 3GPP or non-3GPP access), and each message increments the relevant sub-counter based on the access type. In other examples, no distinction is made between the types of access (e.g., all messages increment a single counter). In some examples, the measurement type (e.g., as defined in 3GPP TS 32.404) for this measurement is AT.SmsOverNasMoReq (or AT.SmsOverNasMo3GPPReq and AT.SmsOverNasRegMo3GPPReq if access distinctions are made). In some examples, the measurement object class (e.g., as defined in 3GPP TS 32.404) is AMFFunction. This measurement can be valid for packet switched traffic, and can be a pure 5GS measurement.

In some examples, the performance measurements related to SMS over NAS include a measurement of successful MO SMS messages over NAS. This measurement can provide the number of MO SMS messages successfully transported over NAS. In some examples, this measurement is collected by a cumulative counter (e.g., an integer value) that is updated in response to transmission by the AMF to the UE of a NAS message that includes a "submit report" indicating that the MO SMS message has been successfully delivered (see, e.g., 3GPP TS 23.502). In some examples, this measurement is split into sub-counters (each of which may be an integer value) based on the type of access used to transport the message (e.g., 3GPP or non-3GPP access), and each successful message increments the relevant sub-counter based on the access type. In other examples, no distinction is made between the types of access (e.g., all messages increment a single counter). In some examples, the measurement type (e.g., as defined in 3GPP TS 32.404) for this measurement is AT.SmsOverNasMoSucc (or AT.SmsOverNasMo3GPPSucc and AT.SmsOverNasRegMo3GPPSucc if access distinctions are made). In some examples, the measurement object class (e.g., as defined in 3GPP TS 32.404) is AMFFunction. This measurement can be valid for packet switched traffic, and can be a pure 5GS measurement.

In some examples, the performance measurements related to SMS over NAS include a measurement of attempted mobile terminated (MT) SMS messages over NAS. This measurement can provide the number of NAS messages encapsulating SMS messages sent by the AF to the UE(s). In some examples, this measurement is collected by a cumulative counter (e.g., an integer value) that is updated in response to transmission of a NAS message with an indication of SMS transportation by the AMF to the UE (see, e.g., 3GPP TS 23.502). In some examples, this measurement is split into sub-counters (each of which may be an integer value) based on the type of access used for the message (e.g., 3GPP or non-3GPP access), and each message increments the relevant sub-counter based on the access type. In other examples, no distinction is made between the types of access (e.g., all messages increment a single counter). In some examples, the measurement type (e.g., as defined in 3GPP TS 32.404) for this measurement is AT.SmsOverNasMtReq (or AT.SmsOverNasMt3GPPReq and AT.SmsOverNasRegMt3GPPReq if access distinctions are made). In some examples, the measurement object class (e.g., as defined in 3GPP TS 32.404) is AMFFuntion. This measurement can be valid for packet switched traffic, and can be a pure 5GS measurement.

In some examples, the performance measurements related to SMS over NAS include a measurement of successful MT SMS messages over NAS. This measurement can provide the number of MT SMS messages successfully transported over NAS. In some examples, this measurement is collected by a cumulative counter (e.g., an integer value) that is updated in response to receipt, by the AMF and from the UE, of a NAS message that includes a "delivery report" indicating that the MT SMS message has been successfully delivered (see, e.g., 3GPP TS 23.502). In some examples, this measurement is split into sub-counters (each of which may be an integer value) based on the type of access used to transport the message (e.g., 3GPP or non-3GPP access), and each successful message increments the relevant sub-counter based on the access type. In other examples, no distinction is made between the types of access (e.g., all messages increment a single counter). In some examples, the measurement type (e.g., as defined in 3GPP TS 32.404) for this measurement is AT.SmsOverNasMtSucc (or AT.SmsOverNasMt3GPPSucc and AT.SmsOverNasRegMt3GPPSucc if access distinctions are made). In some examples, the measurement object class (e.g., as defined in 3GPP TS 32.404) is AMFFuntion. This measurement can be valid for packet switched traffic, and can be a pure 5GS measurement.

Figure 15:
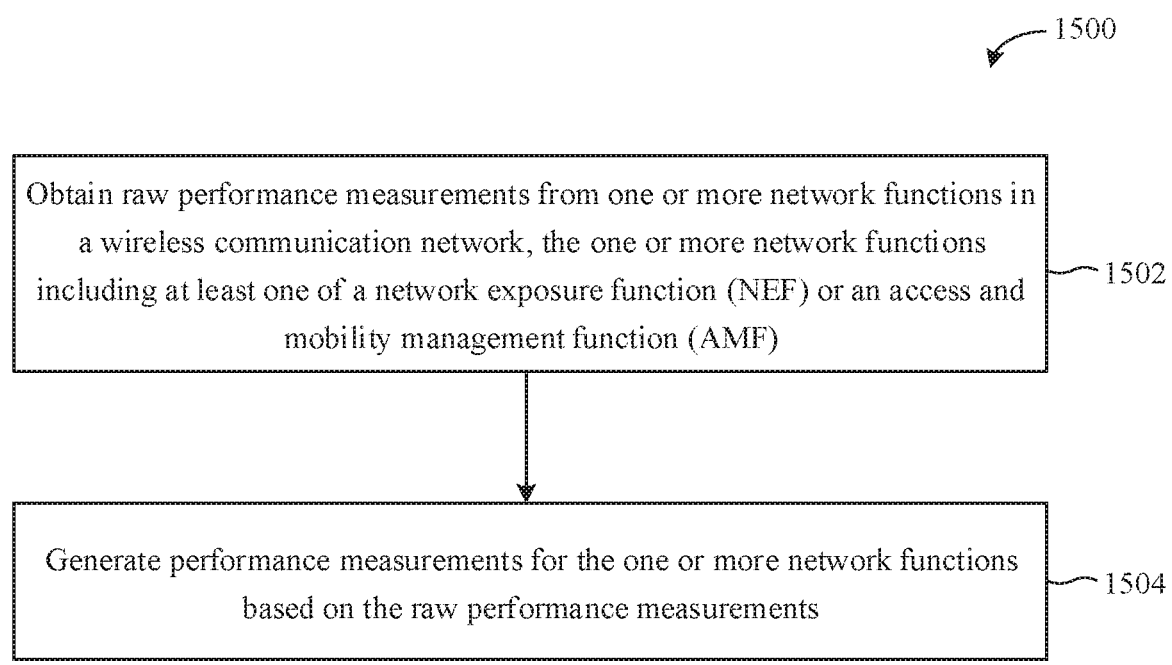
FIG. 15 illustrates an example process for performance measurements related to application triggering and SMS over NAS.

FIG. 15 illustrates a flowchart of an example process 1500 for performance measurements related to application triggering and SMS over NAS. In some examples, the electronic device(s), network(s), system(s), chip(s) or component(s), or portions or implementations thereof, of FIGS. 1-14 may be configured to perform the process 1500.

Operations of the process 1500 include obtaining raw performance measurements from one or more network functions in a wireless communication network (1502). The one or more network functions include at least one of a network exposure function (NEF) or an access and mobility management function (AMF). The raw performance metrics can be obtained, for example, by a core network (e.g., a core network 120, 220, 320, such as a 5G core network) or another component of the wireless communication system 100.

Performance measurements (or performance indicators) for the one or more network functions are generated based on the raw performance measurements (1504). In some examples, the one or more network functions are NEFs (e.g., NEF 323), and the performance measurements are related to application triggering requested by an application function (e.g., AF 328). In some examples, the one or more network functions are AMFs (e.g., AMF 321), and the performance measurements are related to short message service (SMS) over non-access stratum (NAS). In some examples, the performance measurements are specified as part of a communication standard, such as a 3GPP standard (e.g., in 3GPP TS 28.552). In some examples, the raw performance measurements are obtained and/or the performance measurements are generated by a service producer that is located, for example, in one of the one or more NEFs, AMFs, or another management function (e.g., of a core network 120, 220, 320). The generated performance measurements can be stored, transmitted, displayed, or otherwise provided to end users (e.g., service consumers, UEs 101, 201, 301, users accessing exposure points of the core network 120, 220, 320, etc.) in any suitable form.

In some examples, the performance measurements can include one or more of a number of application trigger requests, a number of application trigger requests accepted for delivery, a number of application trigger requests rejected for delivery, a number of protocol data unit (PDU) sessions requested to modify, or a number of application trigger delivery reports. The number of application trigger requests can be based on a cumulative counter that is triggered on receipt of a delivery request (e.g., a Nnef_Trigger_Delivery request) by a NEF from the application function. The number application trigger requests accepted for delivery can be based on a cumulative counter that is triggered on transmission of a delivery response (e.g., a Nnef_trigger_Delivery response) by a NEF to the application function, with the delivery response including an indication that an application trigger request has been accepted for delivery to a UE. The number of application trigger requests rejected for delivery can be based on a cumulative counter that is triggered on transmission of a delivery response (e.g., a Nnef_Trigger_Delivery response) by a NEF to the application function, with the delivery response including an indication that an application trigger request has been rejected for delivery to a UE. In some examples, the number of application trigger requests rejected for delivery is incremented per error code (e.g., per response code, as specified in the 3GPP technical specifications). The number of application trigger delivery reports can be based on a cumulative counter that is triggered on transmission of a delivery message (e.g., a Nnef_Trigger_Delivery Notify message) by a NEF to the application function, with the delivery message including an indication of a delivery result of an application trigger. In some examples, the number of application trigger delivery reports is incremented per delivery result (e.g., success, failure, or another result specified in the 3GPP technical specifications).

In some examples, the performance measurements include one or more of a number of registration requests for SMS over NAS, a number of successful registrations allowed for SMS over NAS, a number of attempted mobile originated (MO) SMS messages over NAS, a number of MO SMS messages successfully transported over NAS, a number of attempted mobile terminated (MT) SMS messages over NAS, or a number of MT SMS messages successfully transported over NAS.

The number of registration requests for SMS over NAS can be based on a cumulative counter that is triggered on receipt of a registration request message by an AMF from a UE, the registration request message including an indication that the UE supports SMS delivery over NAS (e.g., "SMS supported," as specified in 3GPP TS 23.502). The number of successful registrations allowed for SMS over NAS can be based on a cumulative counter that is triggered on transmission of a registration accept message by an AMF to a UE, the registration accept message including an indication that the SMS is allowed (e.g., "SMS allowed," as specified in 3GPP TS 23.502).

The number of attempted MO SMS messages over NAS can be based on a cumulative counter that is triggered on receipt of a NAS message by an AMF from a UE, the NAS message including an indication of SMS transportation. The number of MO SMS messages successfully transported over NAS can be based on a cumulative counter that is triggered on transmission of a NAS message by an AMF to a UE, the NAS message including an indication that the MO SMS message has been successfully delivered.

The number of attempted MT SMS messages over NAS can be based on a cumulative counter that is triggered on transmission of a NAS message by an AMF to a UE, the NAS message including an indication of SMS transportation. The number of MT SMS messages successfully transported over NAS can be based on a cumulative counter that is triggered on receipt of a NAS message by an AMF from a UE, the NAS message including an indication that the MT SMS message has been successfully delivered.

In some examples, the performance measurements can be separated by access type (e.g., 3GPP access and non-3GPP access). In other examples, the performance measurements can be made without regard to the access type.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 may include a service producer supported by one or more processors configured to: obtain the raw performance measurements from NEF(s); and generate the performance measurements for NEF(s) based on the raw performance measurements.

Example 2 may include the service producer of example 1 and/or some other example(s) herein, wherein the service producer is located in an NEF or a management function.

Example 3 may include the service producer of examples 1 and 2 and/or some other example(s) herein, wherein the performance measurement is related to application triggering requested by AF.

Example 4 may include the service producer of example 3 and/or some other example(s) herein, wherein the performance measurement is number of application trigger requests, number of application trigger requests accepted for delivery, number of application trigger requests rejected for delivery, number of PDU Sessions requested to modify, or number of application trigger delivery reports.

Example 5 may include the service producer of example 4 or some other example herein, wherein: the performance measurement of number of application trigger requests is a cumulative counter (CC) which is triggered on receipt of an Nnef_Trigger_Delivery request by the NEF from AF; the performance measurement of number application trigger requests accepted for delivery is a CC which is triggered on transmission of Nnef_Trigger_Delivery response by the NEF to AF indicating the application trigger request has been accepted for delivery to the UE; the performance measurement of number of application trigger requests rejected for delivery is a CC which is triggered on transmission of an Nnef_Trigger_Delivery response by the NEF to AF indicating the application trigger request has been rejected for delivery to the UE; and the performance measurement of number of application trigger delivery reports is a CC which is triggered on Transmission of an Nnef_Trigger_DeliveryNotify message by the NEF to AF indicating the delivery result of the application trigger.

Example 6 may include the service producer of examples 4 and 5 and/or some other example(s) herein, wherein the performance measurement of number of application trigger requests rejected for delivery is incremented to the relevant subcounter per error code.

Example 7 may include the service producer of examples 4 and 5 and/or some other example(s) herein, wherein the performance measurement of number of application trigger delivery reports is incremented to the relevant subcounter per delivery result.

Example 8 may include a service producer supported by one or more processors configured to: obtain the raw performance measurements from AMF(s); and generate the performance measurements for AMF(s) based on the raw performance measurements.

Example 9 may include the service producer of example 8 and/or some other example(s) herein, wherein the service producer is located in an AMF or a management function.

Example 10 may include the service producer of examples 8 and 9 and/or some other example(s) herein, wherein the performance measurement is related to SMS over NAS.

Example 11 may include the service producer of example 10 and/or some other example(s) herein, wherein the performance measurement is number of registration requests for SMS over NAS, number of successful registrations allowed for SMS over NAS, number of attempted MO SMS messages over NAS, number of MO SMS messages successfully transported over NAS, number of attempted MT SMS messages over NAS, or number of MT SMS messages successfully transported over NAS.

Example 12 may include the service producer of example 11 and/or some other example(s) herein, wherein: the performance measurement of number of registration requests for SMS over NAS is a CC which is triggered on receipt of a Registration Request message containing the "SMS supported" indication indicating that the UE supports SMS delivery over NAS by the AMF from UE; the performance measurement of number of successful registrations allowed for SMS over NAS is a CC which is triggered on transmission of a Registration Accept message containing the "SMS allowed" indication by the AMF to UE; the performance measurement of number of attempted MO SMS messages over NAS is a CC which is triggered on receipt of an NAS message with an indication of SMS transportation by the AMF from UE; the performance measurement of number of MO SMS messages successfully transported over NAS is a CC which is triggered on transmission, by the AMF to UE, of an NAS message that contains the "submit report" indicating the MO SMS message has been successfully delivered; the performance measurement of number of attempted MT SMS messages over NAS is a CC which is triggered on transmission of an NAS message with an indication of SMS transportation by the AMF to UE; the performance measurement of number of MT SMS messages successfully transported over NAS is a CC which is triggered on Receipt, by the AMF from UE, of an NAS message that contains the "delivery report" indicating the MT SMS message has been successfully delivered.

Example 13 may include the service producer of examples 10 and 11 and/or some other example(s) herein, wherein the performance measurement is for the case of SMS over NAS via 3GPP access.

Example 14 may include the service producer of examples 10 and 11 and/or some other example(s) herein, wherein the performance measurement is for the case of SMS over NAS via non-3GPP access.

Example 15 may include the service producer of example 13 and/or some other example(s) herein, wherein the messages triggering the counters of example 12 are received or sent via 3GPP access.

Example 16 may include the service producer of example 14 and/or some other example(s) herein, wherein the messages triggering the counters example 12 are received or sent via non-3GPP access.

Example 17 may include a method to be performed by a service producer, the method comprising: obtaining or causing to obtain raw performance measurements from one or more NFs; and generating or causing to generate performance measurements (or performance indicators) for the one or more NFs based on the raw performance measurements.

Example 18 may include the method of example 17 and/or some other example(s) herein, wherein the one or more NFs are NEFs.

Example 19 may include the method of example 18 and/or some other example(s) herein, wherein the service producer is located in one of the one or more NEFs or a management function.

Example 20 may include the method of examples 18 and 19 and/or some other example(s) herein, wherein the generated performance measurements are related to application triggering requested by an AF.

Example 21 may include the method of example 20 and/or some other example(s) herein, wherein the performance measurements include one or more of a number of application trigger requests, a number of application trigger requests accepted for delivery, a number of application trigger requests rejected for delivery, a number of PDU Sessions requested to modify, and/or a number of application trigger delivery reports.

Example 22 may include the method of example 21 and/or some other example(s) herein, wherein the number of application trigger requests is based on a CC that is triggered on receipt of a Nnef_Trigger_Delivery request by the NEF from the AF.

Example 23 may include the method of examples 21 to 22 and/or some other example(s) herein, wherein the number application trigger requests accepted for delivery is based on a CC that is triggered on transmission of Nnef_Trigger_Delivery response by the NEF to the AF indicating the application trigger request has been accepted for delivery to a UE.

Example 24 may include the method of examples 21 to 23 and/or some other example(s) herein, wherein the number of application trigger requests rejected for delivery is based on a CC that is triggered on transmission of an Nnef_Trigger_Delivery response by the NEF to the AF indicating the application trigger request has been rejected for delivery to a UE.

Example 25 may include the method of example 24 and/or some other example(s) herein, wherein the number of application trigger requests rejected for delivery is incremented to the relevant subcounter per error code.

Example 26 may include the method of examples 21 to 25 and/or some other example(s) herein, wherein the number of application trigger delivery reports is based on a CC that is triggered on Transmission of an Nnef_Trigger_DeliveryNotify message by the NEF to the AF indicating the delivery result of the application trigger.

Example 27 may include the method of example 26 and/or some other example(s) herein, wherein the number of application trigger delivery reports is incremented to the relevant subcounter per delivery result.

Example 28 may include the method of example 17 and/or some other example(s) herein, wherein the one or more NFs are AMFs.

Example 29 may include the method of example 28 and/or some other example(s) herein, wherein the service producer is located in one of the one or more AMFs or a management function.

Example 30 may include the method of examples 28 or 29 and/or some other example(s) herein, wherein the generated performance measurements are related to SMS over NAS.

Example 31 may include the method of example 30 and/or some other example(s) herein, wherein the performance measurements include one or more of a number of registration requests for SMS over NAS, a number of successful registrations allowed for SMS over NAS, a number of attempted MO SMS messages over NAS, a number of MO SMS messages successfully transported over NAS, a number of attempted MT SMS messages over NAS, and/or a number of MT SMS messages successfully transported over NAS.

Example 32 may include the method of example 31 and/or some other example(s) herein, wherein the number of registration requests for SMS over NAS is a CC that is triggered on receipt of a Registration Request message containing the "SMS supported" indication indicating that the UE supports SMS delivery over NAS by the AMF from a UE.

Example 33 may include the method of examples 31 or 32 and/or some other example(s) herein, wherein the number of successful registrations allowed for SMS over NAS is a CC that is triggered on transmission of a Registration Accept message containing the "SMS allowed" indication by the AMF to a UE.

Example 34 may include the method of examples 31 to 33 and/or some other example(s) herein, wherein the number of attempted MO SMS messages over NAS is a CC that is triggered on receipt of an NAS message with an indication of SMS transportation by the AMF from a UE.

Example 35 may include the method of examples 31 to 34 and/or some other example(s) herein, wherein the number of MO SMS messages successfully transported over NAS is a CC that is triggered on transmission, by the AMF to UE, of an NAS message that contains the "submit report" indicating the MO SMS message has been successfully delivered.

Example 36 may include the method of examples 31 to 35 and/or some other example(s) herein, wherein the number of attempted MT SMS messages over NAS is a CC that is triggered on transmission of an NAS message with an indication of SMS transportation by the AMF to a UE.

Example 37 may include the method of examples 31 to 36 and/or some other example(s) herein, wherein the number of MT SMS messages successfully transported over NAS is a CC that is triggered on Receipt, by the AMF from a UE, of an NAS message that contains the "delivery report" indicating the MT SMS message has been successfully delivered.

Example 38 may include the method of examples 31 to 37 and/or some other example(s) herein, wherein the performance measurement is for the case of SMS over NAS via 3GPP access.

Example 39 may include the method of example 38 and/or some other example(s) herein, wherein the messages triggering the CCs are received or sent via 3GPP access.

Example 40 may include the method of examples 31 to 39 and/or some other example(s) herein, wherein the performance measurement is for the case of SMS over NAS via non-3GPP access.

Example 41 may include the method of example 40 and/or some other example(s) herein, wherein the messages triggering the CCs are received or sent via non-3GPP access.

Example 42 may include an apparatus comprising means to perform one or more elements of a method described in or related to any of examples 1 to 41, or any other method or process described herein.

Example 43 may include one or more non-transitory computer-readable media comprising instructions to cause an electronic device, upon execution of the instructions by one or more processors of the electronic device, to perform one or more elements of a method described in or related to any of examples 1 to 41, or any other method or process described herein.

Example 44 may include an apparatus comprising logic, modules, or circuitry to perform one or more elements of a method described in or related to any of examples 1 to 41, or any other method or process described herein.

Example 45 may include a method, technique, or process as described in or related to any of examples 1 to 41, or portions or parts thereof.

Example 46 may include an apparatus comprising: one or more processors and one or more computer-readable media comprising instructions that, when executed by the one or more processors, cause the one or more processors to perform the method, techniques, or process as described in or related to any of examples 1 to 41, or portions thereof.

Example 47 may include a signal as described in or related to any of examples 1 to 41, or portions or parts thereof.

Example 48 may include a datagram, packet, frame, segment, protocol data unit (PDU), or message as described in or related to any of examples 1 to 41, or portions or parts thereof, or otherwise described in the present disclosure.

Example 49 may include a signal encoded with data as described in or related to any of examples 1 to 41, or portions or parts thereof, or otherwise described in the present disclosure.

Example 50 may include a signal encoded with a datagram, packet, frame, segment, protocol data unit (PDU), or message as described in or related to any of examples 1 to 41, or portions or parts thereof, or otherwise described in the present disclosure.

Example 51 may include an electromagnetic signal carrying computer-readable instructions, wherein execution of the computer-readable instructions by one or more processors is to cause the one or more processors to perform the method, techniques, or process as described in or related to any of examples 1 to 41, or portions thereof.

Example 52 may include a computer program comprising instructions, wherein execution of the program by a processing element is to cause the processing element to carry out the method, techniques, or process as described in or related to any of examples 1 to 41, or portions thereof.

Example 53 may include a signal in a wireless network as shown and described herein.

Example 54 may include a method of communicating in a wireless network as shown and described herein.

Example 55 may include a system for providing wireless communication as shown and described herein.

Example 56 may include a device for providing wireless communication as shown and described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The following terms and definitions may be applicable to the examples described herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, U/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof.

The term "device" refers to a physical entity embedded inside, or attached to, another physical entity in its vicinity, with capabilities to convey digital information from or to that physical entity.

The term "entity" refers to a distinct component of an architecture or device, or information transferred as a payload.

The term "controller" refers to an element or entity that has the capability to affect a physical entity, such as by changing its state or causing the physical entity to move.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "information element" refers to a structural element containing one or more fields. The term "field" refers to individual contents of an information element, or a data element that contains content.

The term "admission control" refers to a validation process in communication systems where a check is performed before a connection is established to see if current resources are sufficient for the proposed connection.

The term "IP Latency" is the time it takes to transfer a first/initial packet in a data burst from one point to another The term "Mapped 5QI" refers to a 5G QoS identifier (5QI) that is used for a data radio bearer (DRB) within the gNB when a single 5QI is assigned to the DRB, and/or a 5QI that is used for separating certain measurements per QoS class. Individual QoS flows into a common 5QI is specified in 3GPP TS 38.473.

The term "Packet Delay" refers to the time it takes to transfer any packet from one point to another.

The term "Packet Drop Rate" refers to a share of packets that were not sent to the target due to high traffic load or traffic management and should be seen as a part of the packet loss rate.

The term "Packet Loss Rate" refers to a share of packets that could not be received by the target, including packets dropped, packets lost in transmission and packets received in wrong format.

The term "Performance Indicators" refers to performance data aggregated over one or more NFs which is derived from the performance measurements collected at the NF(s), according to the aggregation method identified in the Performance Indicator definition.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/DC.

The term "Special Cell" refers to the PCell of the MCG or the PSCell of the SCG for DC operation; otherwise, the term "Special Cell" refers to the Pcell.

What is claimed is:

1. A method, comprising:
   obtaining performance data from one or more network functions in a wireless communication network, the one or more network functions including at least one of a network exposure function (NEF) or an access and mobility management function (AMF); and
   performing measurements for the one or more network functions based at least in part on the performance data, wherein at least one of the measurements is to increment a subcounter per error code by a number of requests rejected for delivery by the one or more network functions.

2. The method of claim 1, wherein the one or more network functions include the NEF, and wherein the measurements are related to application triggering requested by an application function.

3. The method of claim 2, wherein the measurements include one or more of a number of application trigger requests, a number of application trigger requests accepted for delivery, a number of protocol data unit (PDU) sessions requested to modify, or a number of application trigger delivery reports.

4. The method of claim 3, wherein the number of application trigger requests is based on a cumulative counter that is triggered on receipt of a delivery request by the NEF from the application function.

5. The method of claim 3, wherein the number application trigger requests accepted for delivery is based on a cumulative counter that is triggered on transmission of a delivery response by the NEF to the application function, the delivery response including an indication that an application trigger request has been accepted for delivery to a user equipment (UE).

6. The method of claim 2, wherein the number of requests rejected for delivery comprises a number of application trigger requests rejected for delivery, and wherein the number of application trigger requests rejected for delivery is based on a cumulative counter that is triggered on transmission of a delivery response by the NEF to the application function, the delivery response including an indication that an application trigger request has been rejected for delivery to a user equipment (UE).

7. The method of claim 6, wherein the number of application trigger requests rejected for delivery is split into subcounters per error code, and wherein the number of application trigger requests rejected for delivery is incremented to a relevant one of the subcounters per error code.

8. The method of claim 3, wherein the number of application trigger delivery reports is based on a cumulative counter that is triggered on transmission of a delivery message by the NEF to the application function, the delivery message including an indication of a delivery result of an application trigger.

9. The method of claim 8, wherein the number of application trigger delivery reports is incremented per delivery result.

10. The method of claim 1, wherein the one or more network functions include the AMF, and wherein the measurements are related to short message service (SMS) over non-access stratum (NAS).

11. The method of claim 10, wherein the measurements include one or more of a number of registration requests for SMS over NAS, a number of successful registrations allowed for SMS over NAS, a number of attempted mobile originated (MO) SMS messages over NAS, a number of MO SMS messages successfully transported over NAS, a number of attempted mobile terminated (MT) SMS messages over NAS, or a number of MT SMS messages successfully transported over NAS.

12. The method of claim 11, wherein the number of registration requests for SMS over NAS is based on a cumulative counter that is triggered on receipt of a registration request message by the AMF from a user equipment (UE), the registration request message including an indication that the UE supports SMS delivery over NAS.

13. The method of claim 11, wherein the number of successful registrations allowed for SMS over NAS is based on a cumulative counter that is triggered on transmission of a registration accept message by the AMF to a user equipment (UE), the registration accept message including an indication that the SMS is allowed.

14. The method of claim 11, wherein the number of attempted MO SMS messages over NAS is based on a cumulative counter that is triggered on receipt of a NAS message by the AMF from a user equipment (UE), the NAS message including an indication of SMS transportation.

15. The method of claim 11, wherein the number of MO SMS messages successfully transported over NAS is based on a cumulative counter that is triggered on transmission of a NAS message by the AMF to a user equipment (UE), the NAS message including an indication that the MO SMS message has been successfully delivered.

16. The method of claim 11, wherein the number of attempted MT SMS messages over NAS is based on a cumulative counter that is triggered on transmission of a NAS message by the AMF to a user equipment (UE), the NAS message including an indication of SMS transportation.

17. The method of claim 11, wherein the number of MT SMS messages successfully transported over NAS is based on a cumulative counter that is triggered on receipt of a NAS message by the AMF from a user equipment (UE), the NAS message including an indication that the MT SMS message has been successfully delivered.

18. The method of claim 11, wherein the measurements comprise first measurements for SMS over NAS via 3GPP access and second measurements for SMS over NAS via non-3GPP access.

19. A processor for a telecommunications device, the processor comprising:
- circuitry to execute one or more instructions stored in a storage device that, when executed, cause the processor to perform operations comprising:
  - obtaining performance data from one or more network functions in a wireless communication network, the one or more network functions including at least one of a network exposure function (NEF) or an access and mobility management function (AMF); and
  - performing measurements for the one or more network functions based at least in part on the performance data, wherein at least one of the measurements is to increment a subcounter per error code by a number of requests rejected for delivery by the one or more network functions.

20. A non-transitory computer readable storage medium storing instructions which, when executed by one or more processors, cause the one or more processors to perform operations comprising:
- obtaining performance data from one or more network functions in a wireless communication network, the one or more network functions including at least one of a network exposure function (NEF) or an access and mobility management function (AMF); and
- performing measurements for the one or more network functions based at least in part on the performance data, wherein at least one of the measurements is to increment a subcounter per error code by a number of requests rejected for delivery by the one or more network functions.

* * * * *